(12) United States Patent
Riggle et al.

(10) Patent No.: US 6,311,815 B1
(45) Date of Patent: Nov. 6, 2001

(54) TEXTURED SEPARATOR PLATE AND METHOD OF MAKING

(75) Inventors: John F. Riggle, Noblesville; Richard L. Case, Tipton, both of IN (US)

(73) Assignee: Steel Parts Corporation, Tipton, IN (US)

( * ) Notice: Subject to any disclaimer, the term of this patent is extended or adjusted under 35 U.S.C. 154(b) by 0 days.

(21) Appl. No.: 09/501,619

(22) Filed: Feb. 9, 2000

(51) Int. Cl.[7] .................................................. F16D 13/52
(52) U.S. Cl. ................ 192/70.14; 192/70.2; 192/107 M; 29/895.3; 29/527.1
(58) Field of Search .............................. 192/70.14, 70.19, 192/70.2, 107 M, 107 R; 29/895.3, 895.32, 895.33, 527.1

(56) References Cited

U.S. PATENT DOCUMENTS

| | | | |
|---|---|---|---|
| 4,516,443 | * | 5/1985 | Hamano et al. ............... 192/70.14 X |
| 4,736,828 | * | 4/1988 | Diessner ........................ 192/70.14 X |
| 4,804,071 | * | 2/1989 | Schultz ........................... 192/70.14 X |
| 5,004,089 | | 4/1991 | Hara et al. ................................. 69/2 |
| 5,025,547 | | 6/1991 | Sheu et al. ................................. 25/0 |
| 5,029,686 | | 7/1991 | Yesnik ....................................... 13/60 |
| 5,048,654 | | 9/1991 | Yesnik ......................................... 69/2 |
| 5,337,870 | | 8/1994 | Hays .......................................... 13/64 |
| 5,452,784 | | 9/1995 | Miyoshi et al. .......................... 11/14 |
| 5,535,870 | | 7/1996 | Takezaki et al. ........................ 13/60 |
| 5,682,971 | | 11/1997 | Takakura et al. ....................... 13/60 |
| 5,857,373 | | 1/1999 | DeMare et al. .......................... 39/20 |
| 5,860,890 | | 1/1999 | Antonov .................................... 61/2 |
| 5,878,860 | | 3/1999 | Pavangat et al. ........................ 13/64 |
| 5,890,988 | | 4/1999 | Kasuya et al. ............................. 3/44 |

FOREIGN PATENT DOCUMENTS

| | | | |
|---|---|---|---|
| 5231443 | * | 9/1993 | (JP) ................................... 192/70.14 |
| 626530 | * | 2/1994 | (JP) ................................... 192/70.14 |

* cited by examiner

Primary Examiner—Charles A Marmor
Assistant Examiner—Saúl J. Rodriguez
(74) Attorney, Agent, or Firm—James D. Wood; Jay G. Taylor; Ice Miller

(57) ABSTRACT

The present invention comprises a textured separator plate having specific desirable surface characteristics and method of manufacture of said plate. The separator plate in one embodiment is fashioned from steel which is textured by cold working, for example, by a laser-matte rolling process. Preferably, the surface texture is a repeatable bi-dimensional pattern exhibiting a surface profile which is plateau-like in appearance, the texture comprising a regular pattern of curvilinear recesses defining island-like features.

97 Claims, 12 Drawing Sheets

TEXTURED SEPARATOR PLATE AND METHOD OF MAKING

FIELD OF THE INVENTION

This invention relates to frictional elements such as clutch separator plates used in clutch or brake disc packs for vehicle transmissions and the like and in particular to a separator plate with improved surface features to enhance operation of the disc packs and a method of manufacturing a separator plate with improved surface features.

BACKGROUND OF THE INVENTION

Automotive and industrial automatic transmissions and the like comprise clutch pack assemblies, sometimes also called multi-disc clutch packs. Clutch pack assemblies comprise frictional members, commonly called plates. There are typically two groups of frictional members. A first group comprises plates having a friction enhancing material bonded to the plates, the first group of plates being called friction plates. The second group of plates separates the friction plates and are typically called separator or reaction plates. The separator plates act as reaction members against which the friction plates operate in transferring torque. Typically, one group of plates is internally splined to a first shaft while the other set of plates is externally splined either to a second shaft or a fixed housing as will be discussed more fully below. There will typically be found several clutch pack assemblies in an automatic transmission. Each clutch pack assembly may be selectively used to provide a particular transmission ratio, better known as first gear, second gear, and so on.

To operate effectively, the plates must exhibit high torque transmitting capacity. High torque transmission is related to the coefficient of static friction. It is also desirable for the separator plate to have a large coefficient of dynamic friction which is related to shock and noise prevention as the plate is engaged. Designing for a large torque transmitting capacity, however, may result in a low coefficient of dynamic friction. U.S. Pat. No. 5,535,870 to Takezaki et al. discusses the difficulty in combining in one clutch the characteristics of high torque transmitting capacity, a large ratio of coefficient of dynamic friction to the coefficient of static friction and heat resistance. The '870 patent discloses the combination of two different kinds of commercially available friction members to realize the above characteristics. One friction member has a high coefficient of static friction while the other has a high coefficient of dynamic friction. The '870 patent, however, does not address, among other things, the issue of parasitic drag.

Parasitic drag occurs when the separator plate and the friction plates in a particular clutch pack assembly are not engaged. While in this condition, depending on the particular transmission design, the friction plates, the separator plates or both types of plates may be rotating independent of the other set. This condition is called freewheeling. In some freewheeling situations, the separator plates and the friction plates may be rotating in opposite directions. The plates are in a fluid bath which is used to cool the plates and to reduce wear as the plates are coupled and de-coupled. The fluid bath also carries away debris from the face of the plates. The fluid bath, while beneficial in several respects, does produce drag on the plates. For example, in a transmission where the fluid is transmission fluid, the rotation of the plates through the transmission fluid adjacent the plate is resisted by the transmission fluid. Consequently, energy must be expended to rotate the plates through the transmission fluid. Drag thus acts as a load on the engine in the freewheeling condition and results in, for example, reduced fuel efficiency. Inasmuch as the drag is thus undesired, it may be referred to as a parasitic force.

Additionally, as the plate rotates through the transmission fluid, some rotation of the transmission fluid is effected. Because the plates within a clutch pack assembly are very close to each other, the rotating transmission fluid acts upon the adjacent plates. If, according to the design of the particular transmission, the adjacent plates are moving in the opposite direction or are stopped, the resulting drag is yet another source of parasitic drag.

As discussed above, the presence of fluid between the separator plate and the friction plate in a clutch pack assembly may result in undesired rotation of plates due to drag. In addition to the deleterious effects on efficiency, the undesired rotation may result in an undesired effect referred to as "clunk". Clunk is most frequently noticed as a transmission is shifted out of neutral into reverse or a forward gear. As plates which are rotating in opposite directions are engaged and the rotation of one of the plates is suddenly reversed or stopped, the clutch pack assembly and associated components are mechanically shocked. This is manifested, in part, by a low frequency noise or clunk and a jolt to the vehicle. Clunk is thus undesired as it is an annoyance to the operator and subjects the transmission to undesired mechanical stresses.

U.S. Pat. No. 5,890,988 to Kasuya et al. discloses the use of a gear brake structure instead of a frictional engagement member such as a clutch pack assembly, to avoid rotation of equipment and thus to avoid the deleterious effects of drag. The '988 patent, however, is limited to eliminating drag caused by freewheeling of the frictional engagement members in the reverse gear only. Thus, parasitic drag produced by other frictional engagement members, such as in the first through fifth gears, is not reduced. Moreover, the gear brake of Kasuya et al. requires a significant alteration to the time proven design of transmissions which is realized only through expensive redesign efforts.

In addition to the shortcomings with respect to drag and clunk, prior art clutch packs suffer from a number of wear related shortcomings. One such shortcoming is the so called "break-in" period. Clutch components are designed to operate using friction between two surfaces initially rotating at different relative speeds in order to match the speed of rotation between the two surfaces. This results in the surfaces being worn down over time. When first placed into operation, there is normally an initial period where the change in characteristics such as drag, coefficient of dynamic friction and coefficient of static friction may be relatively rapid. This is commonly referred to as a "break-in" period. Rapid changes in transmission operation can be unsettling to an operator. Thus, it is desired to have a very short "break-in" period, if any, and a consistent rate of change throughout the remaining useful life of the clutch pack assembly such that any change is not perceived by the operator.

A characteristic which is closely related to the break-in characteristic is the shift characteristic. As the friction plate and separator plate are worn, the contact surfaces of components will vary as the components are worn. As the components wear, the contact area typically increases resulting in changes in the coefficient of friction. If the coefficient of friction increases, shifting may become jerky as the plates "grab" each other. Conversely, if the coefficient of friction becomes too small, shifting time may increase appreciably.

Thus, the time required for disengagement of the lower gear and engagement of the higher gear may increase. Depending on the transmission, this may result in, for example, higher revolution rates of the lower gear or in noticeable hesitations in the acceleration. Rapid onset of shifting pattern changes may result in operator consternation while the same changes effected gradually over time are readily adapted to by the operator.

Notwithstanding the '988 patent which replaces an entire clutch pack assembly and the '870 patent which addresses the characteristics of both friction elements, improvements to shortcomings in prior art clutch pack assemblies have typically been directed to improvements in the friction plate. An exception to this is found in U.S. Pat. No. 5,048,654 issued to Yesnick. The '654 patent addresses the problem of increasing the coefficient of friction without increasing the wear of friction plates. Friction plate are typically made with a friction paper mounted on a steel plate. The friction paper is softer than steel, however, so increasing the roughness of the separator plate frequently results in undesired wear of the friction plate.

The '654 patent lists several modification processes aimed at modifying the surface of a separator plate which had not proven desirable. According to the '654 patent, modification was unsuccessfully attempted by various surface preparation procedures including sand blasting, shot peening and knurling. The '654 patent overcomes these process limitations with a separator plate formed entirely from ceramic material and a steel separator plate coated with a ceramic material to overcome the wear problems while increasing the coefficient of friction. As disclosed in the '654 patent, these improved plates exhibit an improved coefficient of friction without substantially increasing the wear of the friction plate lining. Ceramic plates, however, are more expensive to produce than steel plates and require extremely precise manufacturing processes.

While the '654 patent does not disclose when in the manufacturing process the unsuccessful texturing processes of sand blasting, shot peening and knurling were performed in the production of the separator plates, the texturing processes may be performed before or after a separator plate is formed from sheet steel. It is frequently more economical to texture the steel sheet prior to forming the separator plate, such as during cold rolling of the steel. Cold rolling is a process of forming a sheet of steel from stock material as is discussed, for example, in U.S. Pat. No. 5,025,547 to Sheu at al. In cold rolling, coil steel stock is processed through rolling mills, typically to achieve a material of the desired thickness and mechanical properties, by rolling the steel through a series of tandem rolls or work rolls, one on top of another, to reduce the thickness of the stock. The process is performed in conjunction with heating and then cooling of the stock to thereby harden the stock. To impart a texture to the steel, a textured set of rolls can be used. As the steel passes between the rolls, the texture of the rolls is pressed into the steel.

The textured rolls used in cold rolling process may be textured using the processes noted in the '654 patent. The final texture created with rolls textured by these methods, as well as the texture when the processes are performed after the forming of separator plates, is necessarily random in that each impingement of the roll is not individually controlled. Additionally, the texture so imparted tends to produce a topography with jagged spikes. Consequently, it is to be expected that as noted in the '654 patent, these procedures either did not enhance the frictional characteristics in the clutch pack or caused undue wear on the friction plates.

There is needed, therefore, a process which imparts a texture resulting in an acceptable coefficient without unduly increasing the wear of the friction plate.

Another wear related shortcoming of prior art clutch packs is squawk. As the friction plate and separator plate are engaged, there will typically be a difference in the relative velocity of the two plates. As the two plates are forced together, torque is transferred from one spinning plate to the other plate until the two plates are rotating at the same speed. In some cases, there is an increase in the rate of torque transfer as the relative velocity of the plates approaches zero. This increase is commonly accompanied by a high pitched noise. This noise is known in the art as squawk. Obviously, squawk is distracting for the occupant(s) of the vehicle and consequently not desired.

The phenomena of squawk is not fully understood, however, the presence of fluid may reduce undesired squawk. As noted above, the fluid carries away debris which is created as the clutch separator plate and friction plate are worn down. Thus, perturbations to the rate of torque transfer which may result from the presence of unattached debris between the plates is reduced. Of course, as the amount of debris present in the fluid increases, the propensity for squawking also increases.

A better understood benefit of the fluid is the cooling it provides for the clutch pack assembly. This prevents uneven heating of the clutch friction plate and clutch separator plate which would otherwise reduce the life of the clutch pack. U.S. Pat. No. 5,682,971 to Takakura et al. discloses a friction plate having a pattern of grooves for passing oil from the inner portion of the friction plate to the outer portion of the friction plate. The grooves of the '971 patent further allow cooling of the friction plate while the two plates are mated. U.S. Pat. No. 5,878,860 discloses the use of a waved groove to accomplish a similar purpose. Neither of these patents, however, address the surface of the separator plate. Rather, as noted above, the patents are directed to the design of friction plates.

The above shortcomings of prior art separator plates are exacerbated by the tendency toward longer lived vehicles. For example, as a clutch pack ages, the amount of debris in the clutch pack increases. Thus, squawk and increased wear, both of the friction plate and the separator plate, increases. This problem is further exacerbated by a tendency toward maintenance-free vehicles as evidenced by vehicles not needing tune-ups before 100,000 miles. Thus, at least 100,000 miles of debris will accumulate in the transmission or other fluid before the fluid is changed. Consequently, increased robustness in overcoming the above discussed shortcomings is desired.

What is therefore desired is a separator plate which exhibits reduced parasitic drag. It is also desired that the separator plate reduce the occurrence of clunk and squawk. It is further desired that the separator plate exhibit an improved coefficient of friction without unduly increasing the wear of friction plates. It is preferred that the separator plate be simple and inexpensive to manufacture and have a longer life than the separator plates of the prior art.

SUMMARY OF THE INVENTION

The present invention provides a novel separator plate which allows increased fuel efficiency for motor vehicles by significantly reducing parasitic drag in automatic transmissions and the like and/or providing increased torque transmission without undue wear of a friction plate. It is an advantage that the novel separator plate of the present invention is easily incorporated into the transmission without necessitating redesign of the transmission. It is also an advantage that the novel separator plate of the present invention may be manufactured in a simple and inexpensive manner. Additionally, the separator plate of the present invention exhibits a reduced break-in period, a shift pattern with only gradual changes over the useful life of the separator plate, is not susceptible to squawk and/or provides a significant increase in the useful life of the separator plate or clutch pack assembly compared with the prior art. It is a further advantage that the separator plate of the present invention reduces the undesired effects of clunk.

A separator plate according to the present invention has a surface which is textured to have a surface profile comprising a regular pattern of curvilinear recesses. Embodiments of the invention which may be textured during cold rolling of the sheet steel exhibit reduced drag, reduced wear of the friction plate, more gradual shift characteristic changes, reduced squawk and/or reduced clunk. The texture is also believed to decrease the break-in period while providing improved torque transmission. The texturing process is easily incorporated into traditional methods of manufacture and the resulting separator plate does not require redesign of a clutch pack assembly. Other features and advantages of the present invention will be apparent to those of skill in the art in consideration of the following detailed description and the accompanying drawings.

BRIEF DESCRIPTION OF THE DRAWINGS

FIG. 4b is an optical surface profile in three dimensions of the separator plate of FIG. 4a.

FIG. 10b is an exemplary surface roughness profile having the same $R_a$ as the surface roughness profile of FIG. 10a.

DETAILED DESCRIPTION

Figure 1:
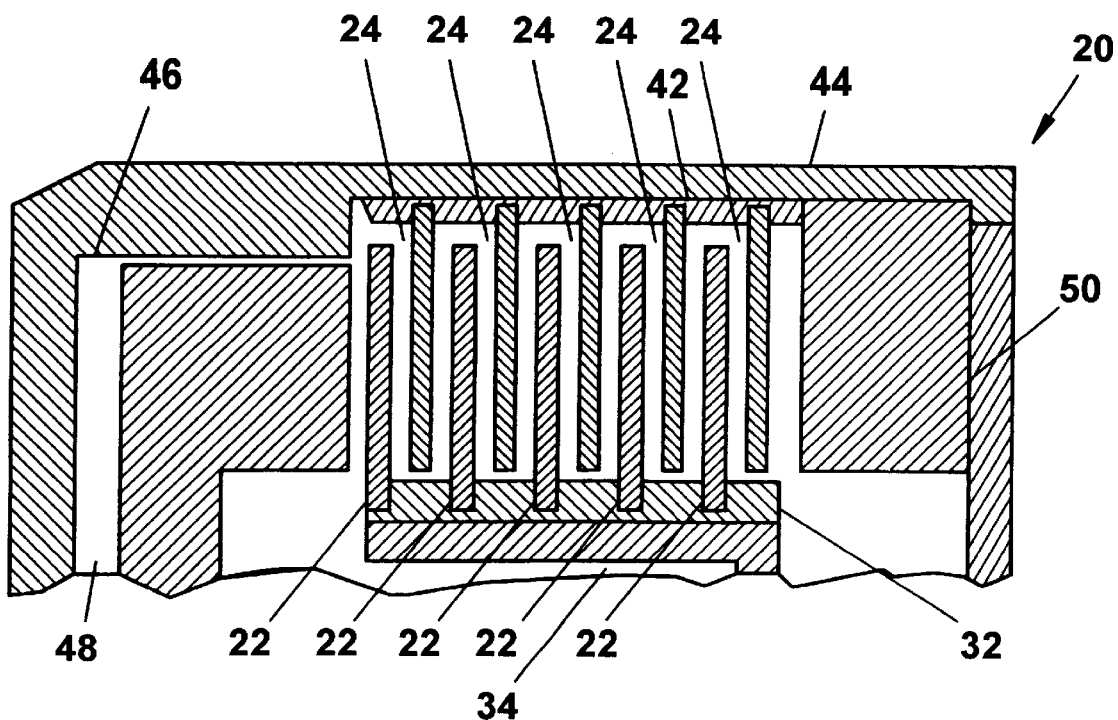
FIG. 1 is a simplified profile view of a conventional clutch pack assembly.

Referring to FIG. 1, clutch pack assembly 20 comprises separator plates according to the present invention interleaved with friction plates. Although there are shown five friction plates 22 and five separator plates 24 in FIG. 1, it should be understood that more or fewer plates may be present in a given application. Friction plates 22 and separator plates 24 are in a fluid bath, hence clutch pack assembly 20 may be referred to as a wet friction engaging device.

Figure 2:
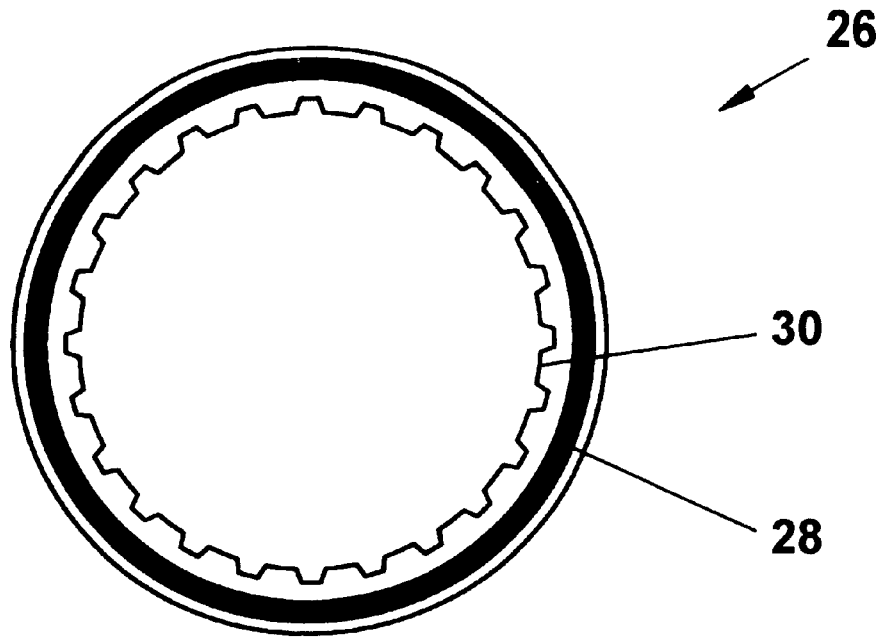
FIG. 2 is a plan view of a conventional friction plate.
Figure 3:
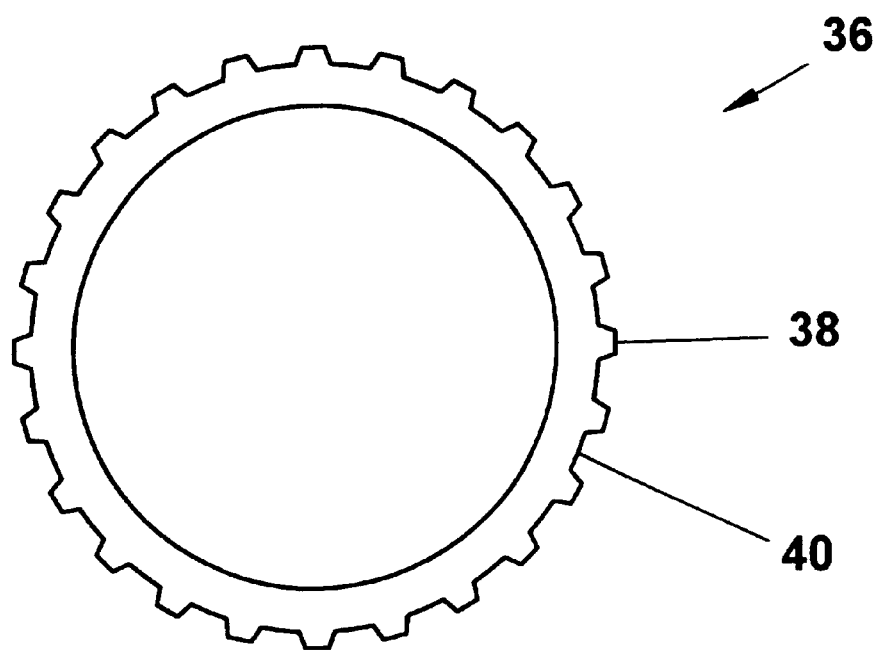
FIG. 3 is a plan view of a separator plate in accordance with the present invention.

Referring now to FIG. 2, friction plate 26 is shown in plan view with friction material 28 and internal splines 30. Depending on the application, friction material 28 may be on either one side only or on both sides of friction plate 26. Internal splines 30 are shaped to operatively engage slots which extend along a shaft such as slot 32 on driven shaft 34 shown in FIG. 1. Each separator plate, such as separator plate 36, shown in plan view in FIG. 3, has external splines 38 which protrude from peripheral edge 40. External splines 38 operatively engage slots such as slot 42 on rotating shaft 44 shown in FIG. 1. For applications wherein it is desired to slow the rotation of the driven shaft which serves as a rotational member, rotating shaft 44 may be, for example, replaced with second member such as a drum fixedly or frictionally attached to a stationary member or replaced with a stationary housing.

Continuing with FIG. 1, chamber 46 is provided to accept fluid and transfer pressure to piston 48. Piston 48, which may be held in an initially disengaged position by means well known in the art, is thus forced against friction plates 22 and separator plates 24. Friction plates 22 and separator plates 41 are forced along slots 32 and 42 respectively toward pressure plate 50. As the plates are sandwiched between piston 48 and pressure plate 50, friction plates 22 and separator plates 24 are forced into frictional contact and torque is transferred from the walls of slot 30 of driven shaft 34 acting against the internal splines of friction plates 22 to separator plates 24. Separator plates 24 in turn transfer torque through their external splines to the walls of slot 42 and thus to rotating shaft 44. The torque thus transferred from friction plates 22 to separator plates 24 may be evidenced by an increase in rotational velocity of separator plates 24 and rotating shaft 44 or by a reduction in rotational velocity of friction plates 22.

Figure 4A:
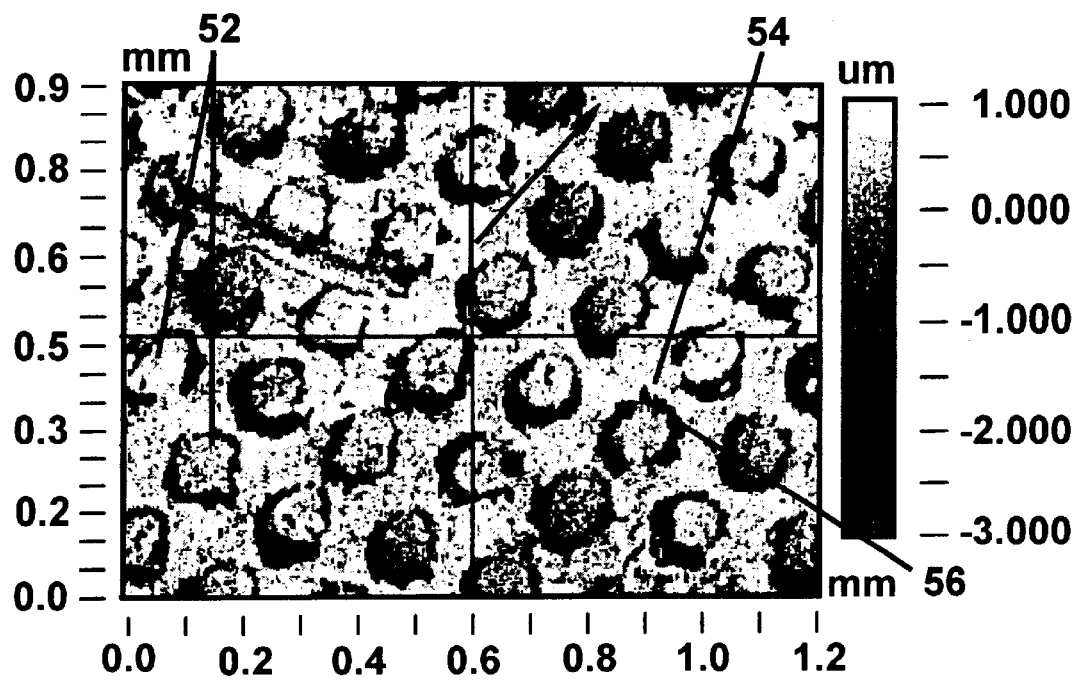
FIG. 4a is an optical surface profile of a separator plate according to the present invention.
Figure 4B:
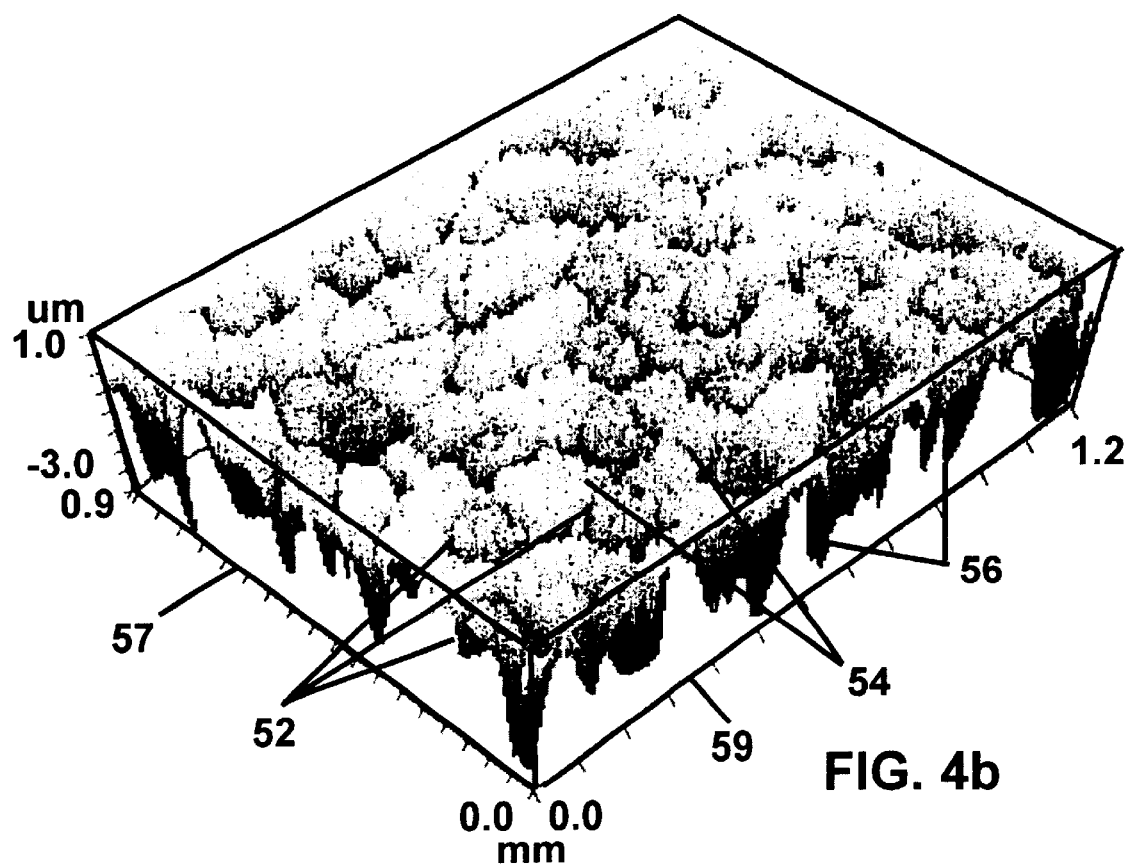

FIG. 4a is an optical surface profile of a portion of the surface of a separator plate according to the present invention. Under magnification, it is shown that separator plate 36 comprises a regular pattern of island-like features 52 within separator surface 54 defined by curvilinear recesses 56. The pattern of island-like features 52 and curvilinear recesses 56 are interposed upon separator surface 54 in a regular pattern as will be described in more detail below. FIG. 4b is a three dimensional optical surface profile of the surface 54 of separator plate 36. Viewing separator plate 36 along either axis 57 or axis 59 of FIG. 4b reveals a surface profile wherein plateaus are separated by valleys, thus being plateau-like in appearance.

Texturing Process

In accordance with the present invention, a separator plate may be formed, for example, from steel which has been textured by cold working. Cold working methods of imparting a texture to stock material include "coining" or "stamping" the texture into the stock material either before or after blanking. In this method, the negative or reverse of the desired pattern to be exhibited in the stock material is engraved into the coining dies which then press the desired pattern into the stock material.

Additionally, cold rolling, as described above, may be used to impart a texture as the stock material is being flattened into the desired thickness. In one embodiment, the stock material, which may be of any acceptable type material such as, but not limited to, SAE 1008/1010 steel, SAE 1020 steel or SAE 1035 steel, is formed from work rolls patterned by a LASER. LASERs are preferred in texturing work rolls for many reasons, one of which is the ability to precisely control the texture applied to the roll. Cold rolled steel which is formed from rolls textured in this manner is commercially available as LaserMatte® strip, produced by Cold Metal Products, Inc. of Youngstown, Ohio. The texture produced by this technology desirably achieves a highly repeatable pattern on the work rolls the negative of which is then transferred to the steel.

The control possible with LASER technology is exemplified in U.S. Pat. No. 5,857,373 to De mare et al. The '373 patent is directed to minimizing the distortions which result when two periodical phenomena are superimposed. De Mare et al. discloses a process wherein the distortion pattern has a wavelength which is so small or so large that it is imperceptible to the eye. The work roll pattern must be a deterministic bi-dimensional pattern. Simply stated, this means the pattern is repeatable in both the X and Y axis (length and radius of the work roll), and may be precisely controlled. The '373 patent thus makes use of the precise control possible with an electron beam technology (EBT) machine to engrave a pattern into two work rolls which will work in opposition to each other on a tandem roll mill. More precisely stated, the negative or reverse of the pattern which is desired in the stock material is engraved into the work rolls. As the rolls flatten and form a piece of stock material, the engraved rolls press the pattern into the stock material.

Figure 5A:
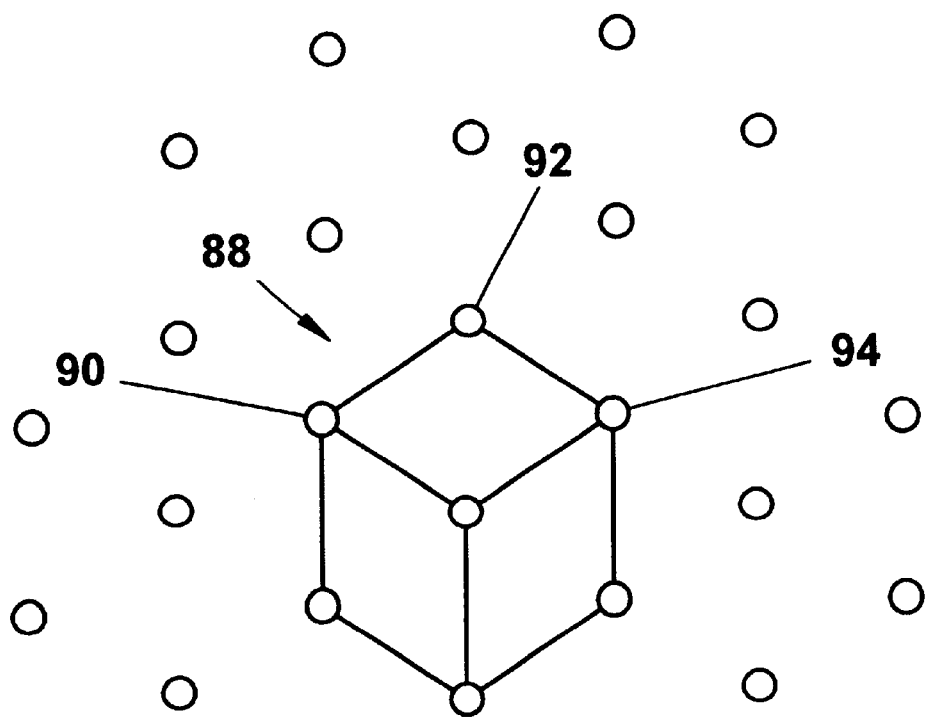
FIG. 5a is a work roll exhibiting unit cells of spots in a top peak pattern.
Figure 5B:
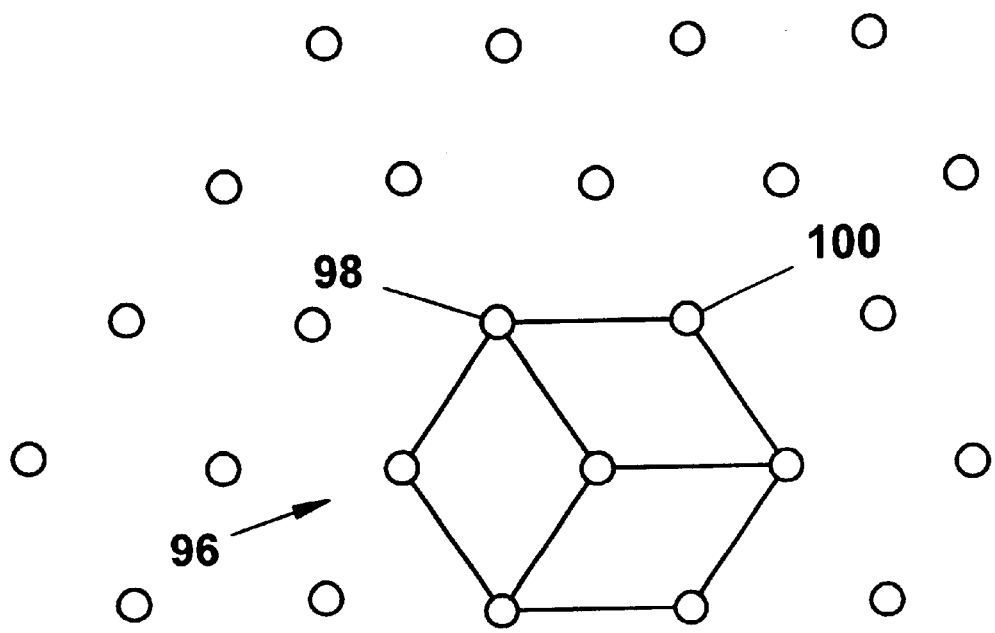
FIG. 5b is a work roll exhibiting unit cells of spots in a top flat pattern.

An embodiment of the '373 patent is a work roll wherein the pattern over the entire surface of the roll is a regular deterministic bi-dimensional pattern in the form of unit cells of spots. A unit cell is the shape depicted by connecting the spots with an imaginary line. For example, referring now to FIG. 5a and FIG. 5b, the spots engraved into work rolls according to the '373 patent are shown. Certain spots have been connected to show two unit cells, both cells being in the shape of centered regular hexagons. Unit cell 88 of FIG. 5a schematically depicts a "top peak" pattern, as a "peak" is formed at the "top" of unit cell 88 by spot 90, spot 92 and spot 94. Unit cell 96 shown in FIG. 5b schematically depicts a "top flat" pattern, as a flat top is defined by spot 98 and spot 100.

Each spot in the pattern represents a crater that is formed in the work roll by the EBT. As the crater is formed, material is displaced by the EBT from the focal point of the EBT and deposited around the edge of the crater. The deposited material forms a protuberance which circumscribes the crater. Thus, the texture imparted into stock material being rolled by work rolls formed in the above fashion consists of a regular bi-dimensional pattern in the form of unit cells of spots, each spot having the form of a curvilinear recess, caused by the protuberance around the formed crater, the curvilinear recess surrounding or defining an island.

The above hexagonal patterns represent the patterns which when repeated over the entire surface of the work roll result in the greatest number of spots on a given work roll which is patterned according to the teaching of De Mare et al. As noted above, an important consideration in the '373 patent is to create a distortion wavelength which is imperceptible. Consequently, the spots in the above patterns must be located at specific distances from each other. The distance is dictated by the desired interference pattern should an interference pattern be experienced. Therefore, as explained more fully in the '373 patent, an important consideration in engraving the work rolls is that the interference wavelength of the pattern in the longitudinal direction $(Y_L)$ of the rolls and in the transverse direction $(Y_Q)$ of the rolls are less than 1.5 mm, wherein $(Y_L)$ and $(Y_Q)$ are defined as follows:

$$\lambda_L = \frac{dq_1 dq_2}{m|kdq_2 - dq_1|}$$

$$\lambda_Q = \frac{dl_1 dl_2}{m|ldl_2 - dl_1|}$$

wherein
  $dl_1 = \max[dl^A, dl_B]$
  $dl_2 = \min[dl^A, dl^B]$
  $dq_1 = \max[n^A dA^A, n^B dA^B]$
  $dq_2 = \min[n^A dA^A, n^B dA^B]$
  $m = \min[n^A, n^B]$
  k,l=a whole number so that the denominator of $Y_L$ and $Y_Q$ is minimal dl=the distance between two spots in the circumferential direction of the roll (which is the longitudinal direction of rolling for a sheet of steel)
  dq=the distance between two spots in the axial direction of the roll between two circumferential lines of spots (which is transverse to the rolling direction)=n,dA
  dA=distance between two circumferences in the axial direction
  n=number of windings on the roll before the crater has the same circumferential position on the roll, n is an integer or a real number
  A=the first textured work roll
  B=the second textured work roll.

Even though precise control is possible in texturing work rolls which may then be used in the making of steel for a separator plate according to the present invention, a significant amount of variation is possible in the pattern realized in the rolled steel. For example, referring to FIG. 4a, many of the island-like features 52 are not completely surrounded by curvilinear recesses 56. Those of skill in the work roll forming art will appreciate that variation such as this is to be expected. Additionally, the depth and shape of the curvilinear recesses formed by a particular work roll will vary over the life of the work roll, as the built up material responsible for shaping the curvilinear recesses is worn away. Further, the shape of the protuberance which forms the recesses need not be substantially circular. For example, forming a crater with the EBT at an oblique angle to the surface of the work roll may form an elliptical crater, with a potentially uneven build up of material around the elliptical crater which varies in form around the crater, as the EBT is used to elongate the initially circular crater, even to the extent of forming substantially straight protuberances. Alternatively, the work roll may be moved relative to the electron beam, thus forming substantially parallel deposits along the path of the relative motion. These and other variations in the shape of the recesses formed being within the scope of the present invention.

Notwithstanding the variations above, the use of LASER technology allows control of the pattern density of the craters formed. The pattern density is believed to be related to the drag characteristics. Consequently, for a given range of separator speeds (RPM), there will be an optimum density, with higher density providing greater benefits at lower speeds. As the work roll texturing art matures, it is believed that increased control in the texturing process will allow for more precise engineering of recesses shapes beyond the present curvilinear indentations to further optimize the separator plate surface texture.

After the steel is textured, it is typically wrapped into a coil and shipped to another site for further processing. Upon receipt of the coiled steel, the steel is first uncoiled and then blanked into separator plates according to practices common in the art.

The blanked separator plates may then be de-burred in the normal fashion. According to one method of de-burring, the blank is passed through an in-line vibratory de-burr system such as Model V-70TF Continuous Vibratory Finishing Machine, commercially available through ALMCO Industrial Finishing Systems of Albert Lea, Minnesota. The de-burred separator plate then passes through a rust inhibitor such as type Chemtrol 352 available from Precision Finishing, Inc., of Sellersville, Pa. Any excess rust inhibitor may be removed by then passing the separator plate through a cob drying station. Next, the separator plates are heat set by heating them while under pressure, a practice which is common in the art. The primary function of heating the separator plates under pressure is to impart a new "memory" into the steel. This is needed because the steel was coiled while warm which results in the steel "remembering" this coiled condition. Thus, there is a tendency to return to a coiled shape unless the steel's "memory" is reprogrammed. A final rust inhibitor may then be applied to the separator plates which may be type EcoKor, available from National Chemical and Oil Corporation of Oak Park, Mich.

EXAMPLE 1

The drag characteristics of clutch pack assemblies utilizing prior art separator plates and separator plates according to the present invention were evaluated under a wide range of operating conditions. In this evaluation, a transmission comprising a typical group of clutch pack assemblies providing reverse gear and gears one through four was connected to a dynamometer. Transmission fluid of the type Ford Type B was used to provide cooling and lubrication. The dynamometer was also connected to an engine. The input torque was measured according to the output of the engine and the drag exerted on the non-engaged separator plates in the non-engaged clutch pack assemblies was recorded for each shift position. An initial run was performed using clutch pack assemblies incorporating conventional prior art separator plates to establish a baseline.

Once the baseline was established, the clutch pack assemblies comprising conventional prior art separator plates were exchanged for clutch pack assemblies comprising separator plates according to the present invention. The percentage reduction in drag exhibited by the clutch packs comprising separator plates according to the present invention when the transmission was in first gear is presented in the following table.

TABLE 1

| | RPM\Transmission Fluid Pressure (PSI) | | | | | | | | | | | |
|---|---|---|---|---|---|---|---|---|---|---|---|---|
| | 95 | 130 | 160 | 170 | 180 | 200 | 205 | 210 | 220 | 230 | 235 | 240 |
| 750 | 23.5% | 15.8% | 15.5% | 15.0% | 14.4% | | | | | | | |
| 1000 | 24.7% | 18.0% | 16.8% | 14.5% | 15.6% | 14.6% | 13.6% | 13.3% | 12.4% | 11.5% | 11.4% | 11.9% |
| 1500 | 23.9% | 18.8% | 18.2% | 16.1% | 16.5% | 16.5% | 16.3% | 15.2% | 14.1% | 13.7% | 13.6% | 14.8% |
| 2000 | 22.2% | 19.4% | 18.9% | 17.6% | 18.2% | 17.5% | 16.5% | 15.4% | 13.6% | 13.3% | 13.9% | 13.8% |
| 2500 | 24.1% | 22.5% | 22.1% | 20.6% | 21.2% | 20.4% | 21.0% | 19.8% | 19.4% | 19.8% | 19.6% | 20.2% |
| 3000 | 35.8% | 32.6% | 30.5% | 26.0% | 26.5% | 27.5% | 27.2% | 26.0% | 25.5% | 25.9% | 25.7% | 24.5% |
| AVG | 25.6% | 21.0% | 20.1% | 18.1% | 18.5% | 18.8% | 18.2% | 17.0% | 16.6% | 16.4% | 16.4% | 16.6% |

The percentage reduction in drag exhibited by the clutch packs comprising separator plates according to the present invention when the transmission was in second gear is presented in the following table.

TABLE 2

| | RPM\Transmission Fluid Pressure (PSI) | | | | | | | | | | | |
|---|---|---|---|---|---|---|---|---|---|---|---|---|
| | 95 | 130 | 160 | 170 | 180 | 200 | 205 | 210 | 220 | 230 | 235 | 240 |
| 750 | 33.6% | 25.0% | 23.9% | 21.9% | 22.0% | | | | | | | |
| 1000 | 30.3% | 24.0% | 22.9% | 20.1% | 20.8% | 19.5% | 18.0% | 15.3% | 13.9% | 12.6% | 12.5% | 12.9% |
| 1500 | 21.4% | 16.4% | 15.7% | 15.2% | 16.3% | 16.2% | 15.9% | 17.1% | 11.3% | 11.7% | 11.0% | 11.4% |
| 2000 | 25.6% | 20.4% | 20.2% | 17.3% | 17.7% | 16.1% | 15.1% | 16.5% | 16.1% | 15.0% | 16.3% | 16.8% |
| 2500 | 31.7% | 25.0% | 22.2% | 21.6% | 21.9% | 20.2% | 20.0% | 17.9% | 16.7% | 17.1% | 17.6% | 18.2% |

TABLE 2-continued

| | RPM\Transmission Fluid Pressure (PSI) | | | | | | | | | | |
|---|---|---|---|---|---|---|---|---|---|---|---|
| | 95 | 130 | 160 | 170 | 180 | 200 | 205 | 210 | 220 | 230 | 235 | 240 |
| 3000 | 31.7% | 27.5% | 25.3% | 23.8% | 24.0% | 22.4% | 22.9% | 21.6% | 21.9% | 21.6% | 22.2% | 22.0% |
| AVG | 29.1% | 23.0% | 21.7% | 19.9% | 20.4% | 20.8% | 20.1% | 17.5% | 15.7% | 15.2% | 15.5% | 15.8% |

The percentage reduction in drag exhibited by the clutch packs comprising separator plates according to the present invention when the transmission was in third gear is presented in the following table.

TABLE 3

| | RPM\Transmission Fluid Pressure (PSI) | | | | | | | | | | |
|---|---|---|---|---|---|---|---|---|---|---|---|
| | 95 | 130 | 160 | 170 | 180 | 200 | 205 | 210 | 220 | 230 | 235 | 240 |
| 750 | 31.9% | 22.9% | 21.4% | 20.0% | 20.2% | | | | | | | |
| 1000 | 32.0% | 25.9% | 24.0% | 21.8% | 22.5% | 21.8% | 20.7% | 17.8% | 17.4% | 16.5% | 16.4% | 16.8% |
| 1500 | 28.9% | 23.4% | 22.4% | 21.2% | 22.8% | 20.9% | 19.5% | 19.7% | 16.5% | 15.4% | 15.9% | 15.8% |
| 2000 | 31.8% | 22.8% | 21.8% | 22.3% | 24.5% | 22.9% | 21.1% | 18.2% | 17.7% | 16.5% | 15.7% | 15.4% |
| 2500 | 32.0% | 28.9% | 26.7% | 25.0% | 25.3% | 23.2% | 22.0% | 20.6% | 20.2% | 19.8% | 19.8% | 20.4% |
| 3000 | 34.2% | 31.0% | 29.7% | 29.0% | 28.4% | 25.8% | 26.3% | 24.0% | 23.5% | 23.1% | 22.9% | 24.3% |
| AVG | 31.7% | 25.5% | 24.1% | 22.9% | 23.6% | 23.7% | 22.5% | 19.8% | 18.8% | 17.9% | 17.8% | 18.2% |

The percentage reduction in drag exhibited by the clutch packs comprising separator plates according to the present invention when the transmission was in fourth gear is presented in the following table.

TABLE 4

| | RPM\Transmission Fluid Pressure (PSI) | | | | | | | | | | |
|---|---|---|---|---|---|---|---|---|---|---|---|
| | 95 | 130 | 160 | 170 | 180 | 200 | 205 | 210 | 220 | 230 | 235 | 240 |
| 750 | 28.1% | 20.3% | 19.0% | 17.9% | 18.1% | | | | | | | |
| 1000 | 23.6% | 21.1% | 19.4% | 18.1% | 18.8% | 15.7% | 14.5% | 13.1% | 12.4% | 12.7% | 12.1% | 12.4% |
| 1500 | 20.0% | 17.4% | 16.3% | 15.9% | 14.9% | 15.5% | 14.1% | 12.6% | 11.7% | 11.5% | 12.0% | 12.4% |
| 2000 | 25.0% | 21.2% | 18.5% | 17.2% | 18.3% | 17.8% | 18.2% | 16.5% | 15.6% | 15.3% | 15.8% | 15.0% |
| 2500 | 29.8% | 23.2% | 21.0% | 19.8% | 19.5% | 18.9% | 18.6% | 16.9% | 14.4% | 14.2% | 14.7% | 13.9% |
| 3000 | 25.2% | 21.6% | 23.0% | 21.0% | 21.9% | 20.2% | 20.0% | 19.5% | 18.7% | 17.6% | 18.2% | 18.7% |
| AVG | 25.2% | 20.7% | 19.4% | 18.2% | 18.5% | 18.0% | 17.3% | 15.7% | 14.4% | 13.9% | 14.3% | 14.3% |

The percentage reduction in drag exhibited by the clutch packs comprising separator plates according to the present invention when the transmission was in neutral with the

TABLE 5

| | RPM\Transmission Fluid Pressure (PSI) | | | | | | | | | | | |
|---|---|---|---|---|---|---|---|---|---|---|---|---|
| | 70 | 95 | 130 | 160 | 170 | 180 | 200 | 205 | 210 | 220 | 230 | 235 | 240 |
| 750 | 15.9% | 16.8% | 4.0% | 12.0% | 11.6% | 11.2% | | | | | | | |
| 1000 | 15.1% | 16.7% | 4.0% | 11.4% | 11.6% | 13.3% | 10.9% | 10.7% | 9.2% | 9.1% | 8.3% | 8.8% | 10.0% |
| 1500 | 17.2% | 18.8% | 14.5% | 13.2% | 12.7% | 13.8% | 13.4% | 13.2% | 11.6% | 10.6% | 11.0% | 10.3% | 10.8% |
| 2000 | 17.8% | 19.1% | 14.4% | 14.3% | 13.1% | 13.5% | 13.2% | 12.4% | 10.1% | 10.6% | 11.2% | 9.7% | 10.3% |
| 2500 | 10.9% | 16.2% | 13.3% | 12.5% | 12.2% | 11.9% | 11.7% | 11.6% | 10.8% | 10.6% | 9.8% | 10.3% | 9.7% |
| 3000 | 14.2% | 17.5% | 12.4% | 13.2% | 11.5% | 11.3% | 11.8% | 11.6% | 10.8% | 9.9% | 10.4% | 9.7% | 9.6% |
| AVG | 15.1% | 17.5% | 10.8% | 12.8% | 12.1% | 12.5% | 11.2% | 10.7% | 9.2% | 8.6% | 10.1% | 9.8% | 10.1% | forward clutch on is presented in the following table.

The percentage reduction in drag exhibited by the clutch packs comprising separator plates according to the present invention when the transmission was in neutral with the forward clutch off is presented in the following table.

TABLE 6

| | RPM\Transmission Fluid Pressure (PSI) | | | | | | | | | | | | |
|---|---|---|---|---|---|---|---|---|---|---|---|---|---|
| | 70 | 95 | 130 | 160 | 170 | 180 | 200 | 205 | 210 | 220 | 230 | 235 | 240 |
| 750 | 10.6% | 11.4% | 5.5% | 7.0% | 7.6% | 6.5% | | | | | | | |
| 1000 | −1.5% | 5.4% | 1.2% | 3.0% | 2.9% | 3.7% | 2.6% | 1.7% | −0.8% | 0.8% | 1.6% | 1.5% | 3.0% |
| 1500 | −3.1% | 8.0% | −1.2% | 2.2% | 2.2% | 2.1% | 1.0% | 2.0% | 0.0% | 1.9% | 0.9% | 2.8% | 2.7% |
| 2000 | −16.7% | −7.2% | −7.9% | −4.8% | −4.7% | −3.4% | −4.4% | −4.4% | −4.3% | −4.2% | −5.2% | −5.2% | −5.1% |
| 2500 | −33.3% | −10.8% | −11.3% | −7.7% | −7.4% | −6.0% | −7.0% | −6.9% | −9.1% | −8.9% | −14.9% | −14.8% | −14.6% |
| 3000 | −46.0% | −31.0% | −27.3% | −25.4% | −24.3% | −23.7% | −21.5% | −22.5% | −23.8% | −23.2% | −24.1% | −22.6% | −23.8% |
| AVG | −12.9% | −2.6% | −5.7% | −3.1% | −2.8% | −2.3% | −4.9% | −5.1% | −6.6% | −5.6% | −7.0% | −6.3% | −6.0% |

The percentage reduction in drag exhibited by the clutch packs comprising separator plates according to the present invention when the transmission was in reverse is presented in the following table.

TABLE 7

| | RPM\Transmission Fluid Pressure (PSI) | | | | | | | | | | | |
|---|---|---|---|---|---|---|---|---|---|---|---|---|
| | 130 | 170 | 210 | 220 | 230 | 250 | 260 | 270 | 280 | 290 | 295 | 300 |
| 1000 | −2.2% | −1.3% | −7.2% | −7.6% | −6.3% | −5.6% | | | | | | |
| 1500 | −1.4% | 1.3% | 0.6% | 0.0% | 2.3% | 3.8% | 3.2% | 2.6% | 1.0% | 1.5% | 2.0% | 2.4% |
| 2000 | 13.1% | 12.2% | 10.3% | 9.5% | 9.3% | 9.6% | 8.4% | 6.6% | 5.4% | 4.2% | 4.7% | 5.6% |
| 2500 | 14.9% | 15.9% | 12.4% | 12.3% | 12.7% | 12.3% | 12.1% | 11.9% | 9.9% | 9.6% | 9.5% | 9.4% |
| AVG | 6.1% | 6.9% | 3.9% | 3.3% | 4.3% | 4.8% | 8.2% | 6.8% | 4.8% | 3.7% | 3.8% | 3.7% |

The results of this test indicate a surprisingly substantial reduction in parasitic drag while most of the forward gears were engaged. The results further indicate a relationship between the effect of the inventive separator plates, the speed of rotation and pressure of the transmission fluid. Thus, it is believed that the density of the pattern may be adjusted to optimize the performance of the clutch pack for a given operating environment.

EXAMPLE 2

Figure 6:
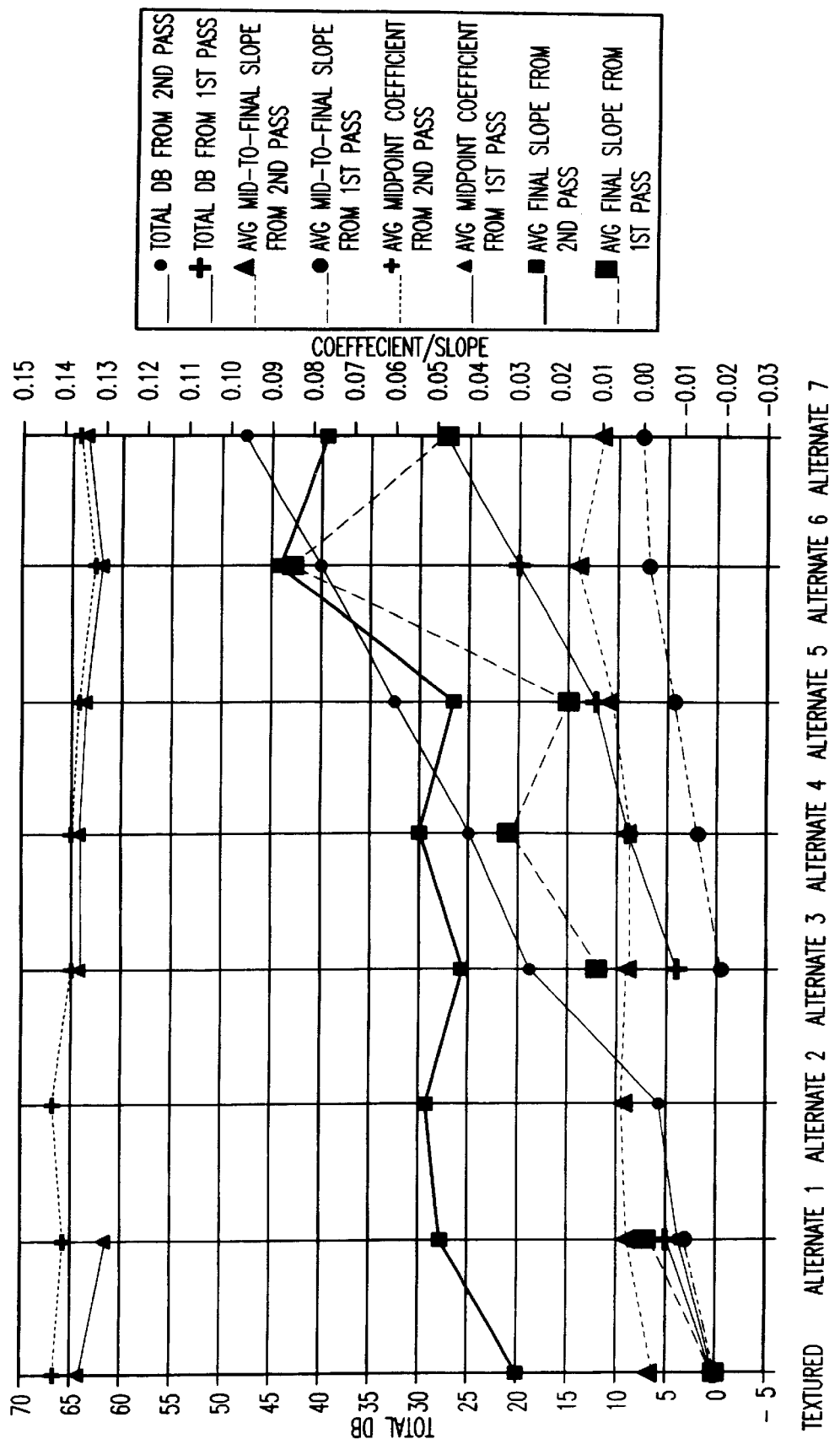
FIG. 6 is a graph showing frictional characteristics and noise characteristics from a testing sequence of a separator plate according to the present invention and several prior art separator plates.
Figure 7:
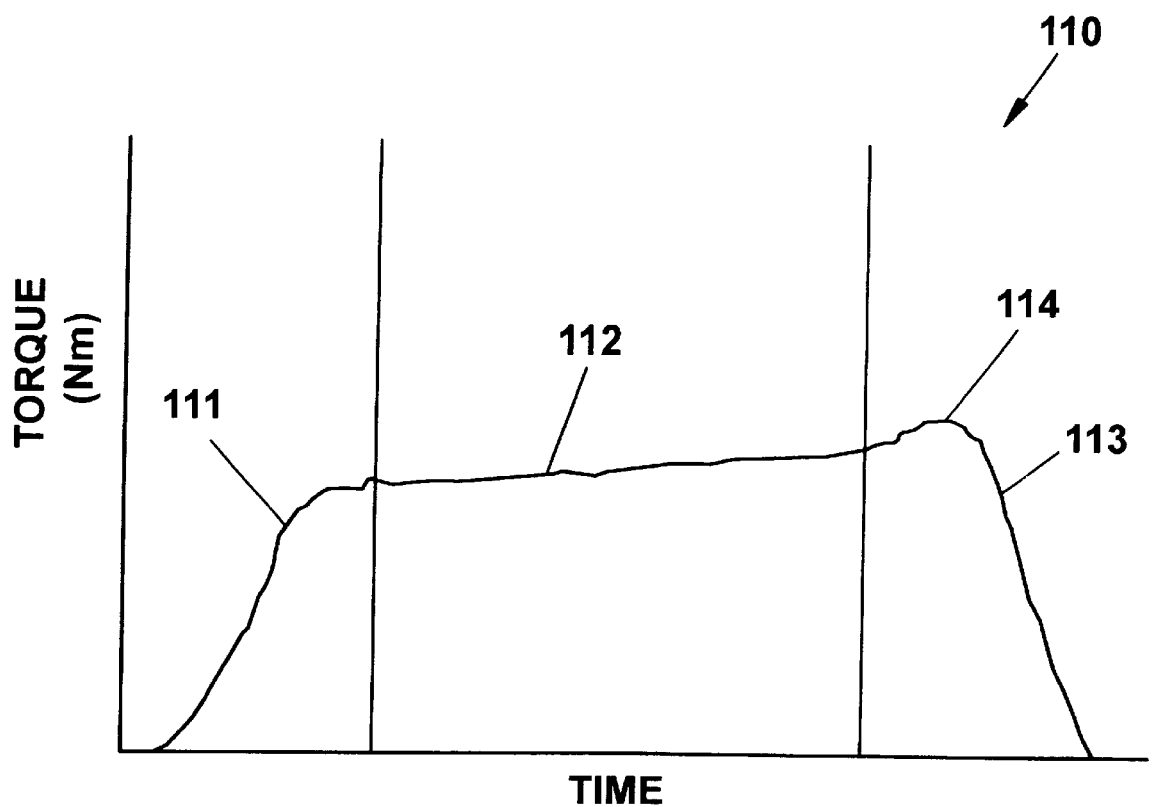
FIG. 7 is a graph showing a typical torque curve plotting torque transferred over time during a separator plate/clutch plate engagement.

FIG. 6 is a graph which plots the frictional and noise characteristics of a separator plate according to the present invention and seven separator plates of various alternative surface textures. The plates were tested using fluid of the type EXXON B in an SAE No. 2 Friction Test Machine with clutch head assembly available from Greening Associates, Inc. of Detroit, Mich. The plates were initially operated to break-in the clutch packs. The clutch packs were then subjected to a first test or pass of 360 cycles with apply pressures varied between 83 and 373 kPa. A second pass using the same procedure as the first pass was then performed and additional data collected. The data collected included torque versus time such as the curve shown in FIG. 7. According to normal practice, curve 110 is divided into an initial section 111, a midpoint section 112 and a final section 113. Initial section 111 is defined as the initial twenty-five percent of the engagement time, midpoint section 112 is defined as the next fifty percent of the engagement time, and final section 113 is defined as the remaining twenty-five percent of the engagement time. The average coefficient of friction plotted in midpoint section 112, or average midpoint coefficient, is then calculated. The slope of curve 110 at the extreme right side of section 112 as shown in FIG. 7 was also determined. This slope is referred to as the mid-to-final slope. Further, the final slope, defined as the maximum slope before knee 114 of curve 110 is determined. In addition to the coefficient of friction, the sound generated during the closing engagement was measured.

The results of the test were then plotted as shown in FIG. 6. The textured separator plate in accordance with the present invention is graphed on the vertical line on the extreme left of FIG. 6. Alternative textures are plotted as Alternate 1, 2, 3, 4, 5, 6 and 7 on the ensuing vertical lines. Alternate 3 is a conventional prior art separator plate which is commercially available, the remaining alternate separator plates represent alternative textures which were tested.

The results of this test show that separator plates according to the present invention generally produced a lower noise during operation while exhibiting generally superior frictional properties, namely, higher coefficient of friction and lower slopes.

Quantitative Description of One Embodiment

Figure 8A:
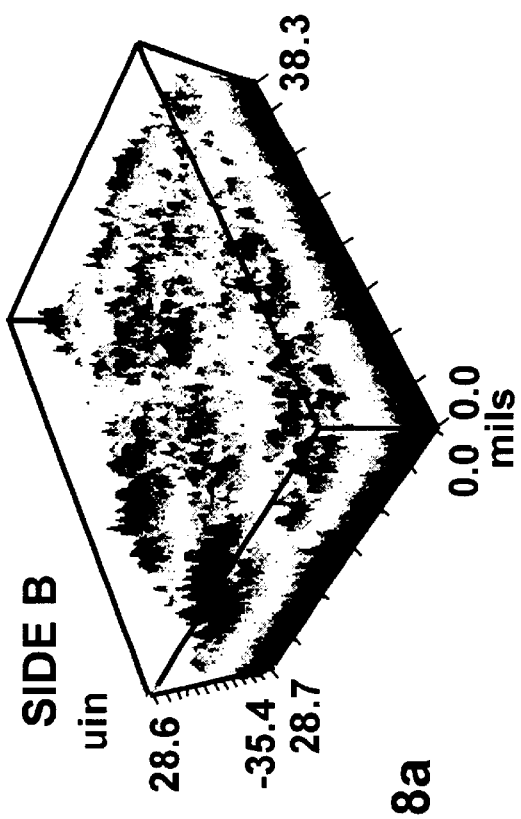
FIG. 8a is an optical surface profile in three dimensions from both sides of alternate separator plate 1 of FIG. 6.
Figure 8A:
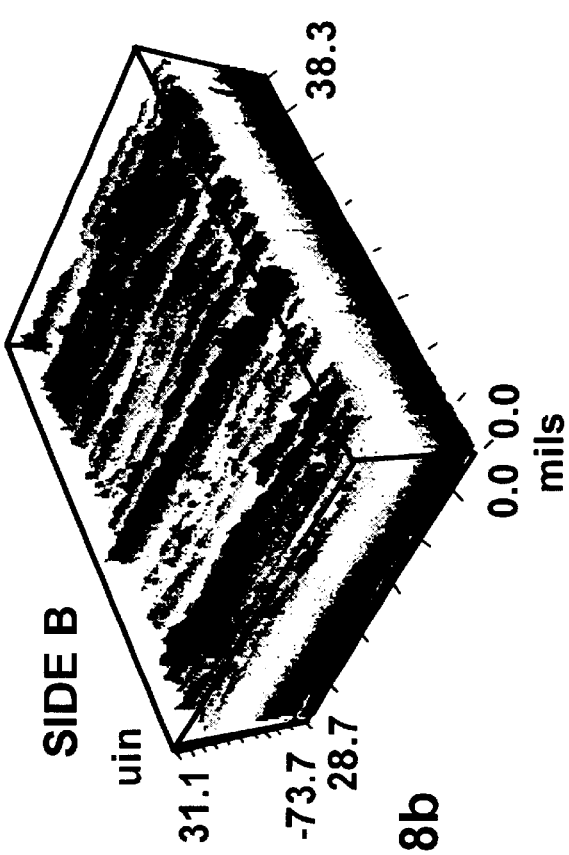
Figure 8B:
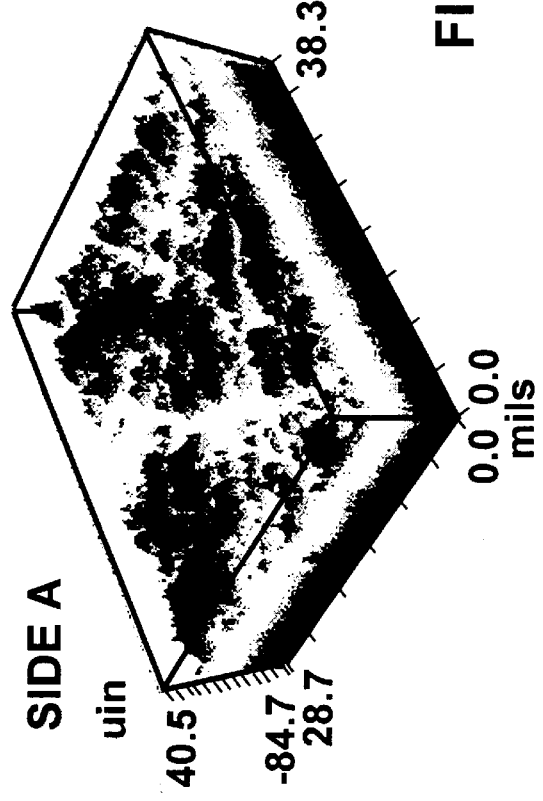
FIG. 8b is an optical surface profile in three dimensions from both sides of alternate separator plate 2 of FIG. 6.
Figure 8B:
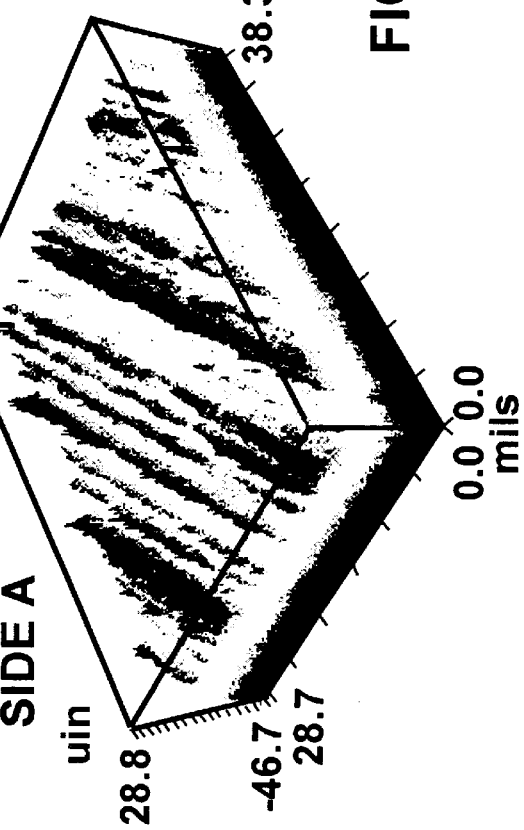
Figure 8C:
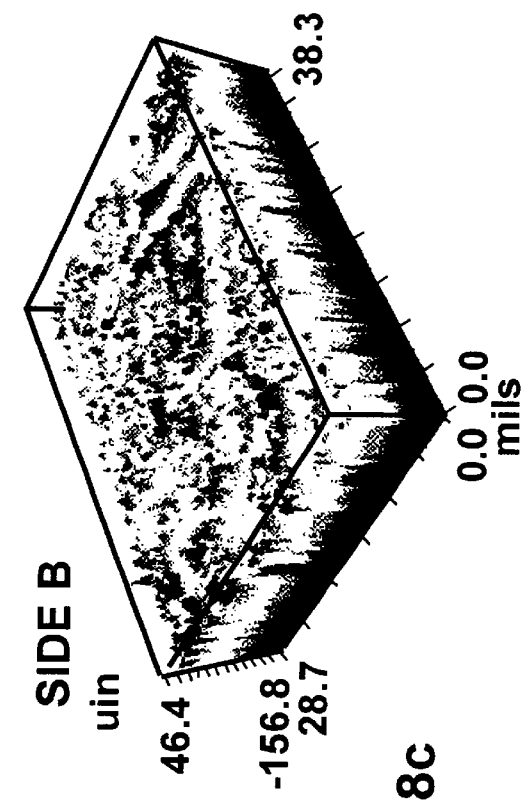
FIG. 8c is an optical surface profile in three dimensions from both sides of alternate separator plate 3 of FIG. 6.
Figure 8D:
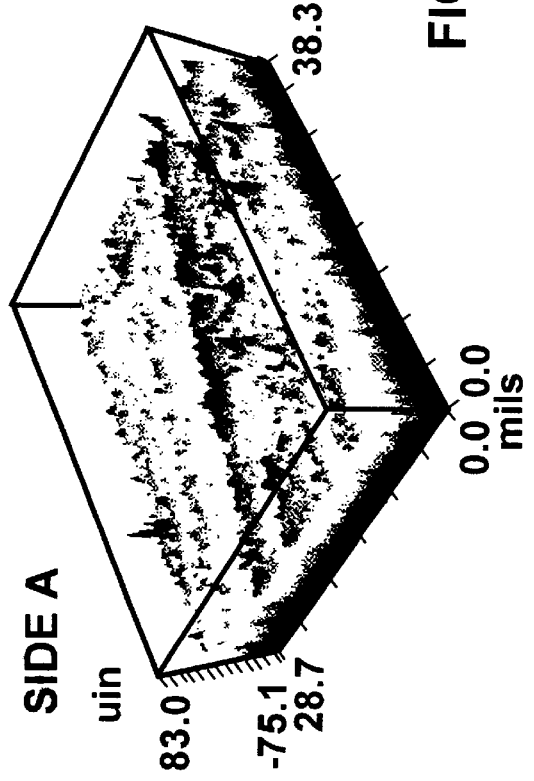
FIG. 8d is an optical surface profile in three dimensions from both sides of alternate separator plate of FIG. 6.
Figure 8D:
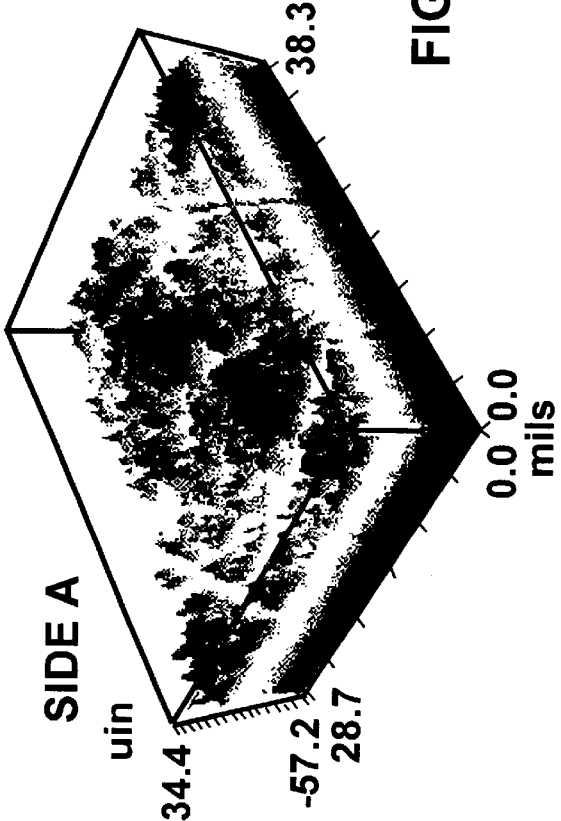

Because of the surprising improvement exhibited by the present invention when compared to the prior art, the surface characteristics of the present invention and of conventional prior art plates and other textured plates were analyzed. FIG. 8a through FIG. 8d show the optical surface profile in three dimensions from both sides of several of the plates tested in the above examples. FIG. 8C shows the optical surface profile of a separator plate fashioned in the same manner as the separator plates used to provide baseline data for Example 1 above. The surfaces display jagged, irregular features. In contrast, the surface profile of a separator plate according to the present invention is much more rounded and regular in appearance as shown in FIG. 4b.

It was desired to quantify the obvious visual differences between the present invention separator plate surface and conventional separator plate surfaces. According to the prior art, it could be assumed that defining the nature of the surface in terms of the arithmetic average surface roughness ($R_a$), representing the height or depth of peaks and valleys from a surface reference, would adequately define the surface of separator plate 36. For example, in U.S. Pat. No. 5,048,654 to Yesnik, discussed infra, an improved clutch is disclosed and defined in terms of having a ceramic surface with an $R_a$ of from 1.0 to 40.0 μin.

A shortcoming which the '654, patent was directed to was that steel separator plates roughened by various processes did not perform satisfactorily. Specifically, plates exhibiting increased coefficient of friction also increased the wear of the friction plates. However, the '654 patent does not disclose the $R_a$ of steel separator plates tested. It is not known therefore, whether or not the steel surfaces so roughened exhibited an $R_a$ comparable to the above values given for ceramic surfaces.

Figure 9A:
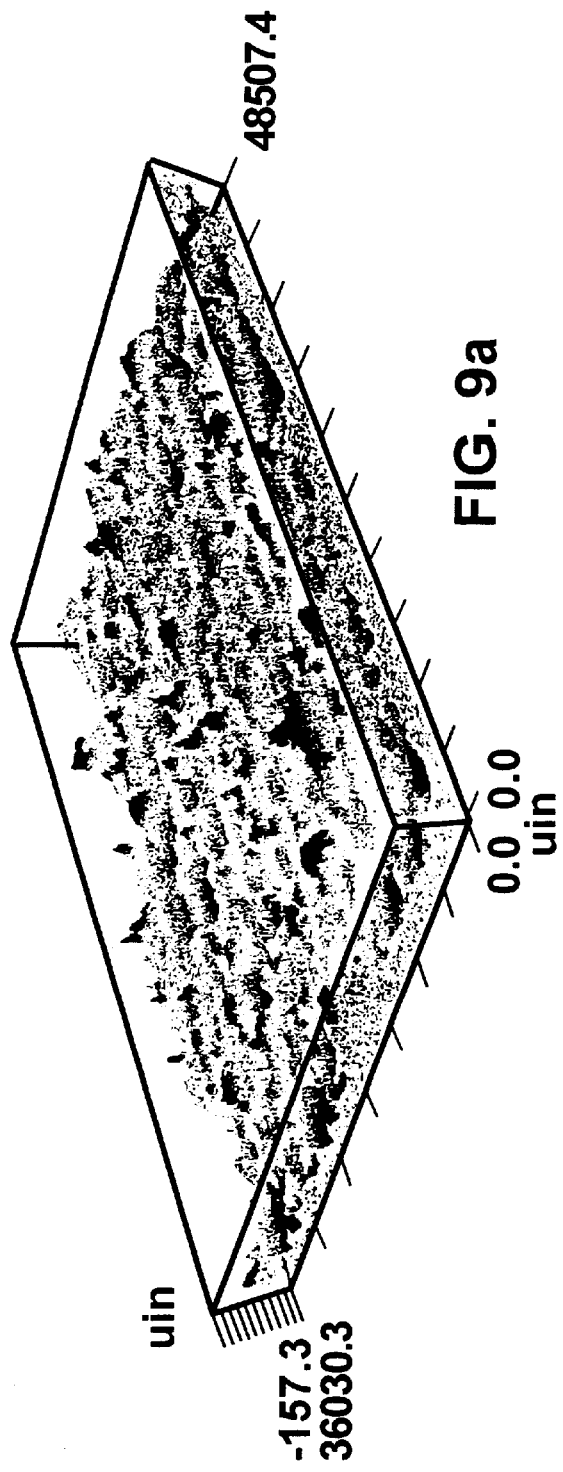
FIG. 9a is an optical surface profile in three dimensions of steel textured by an EDT process.
Figure 9B:
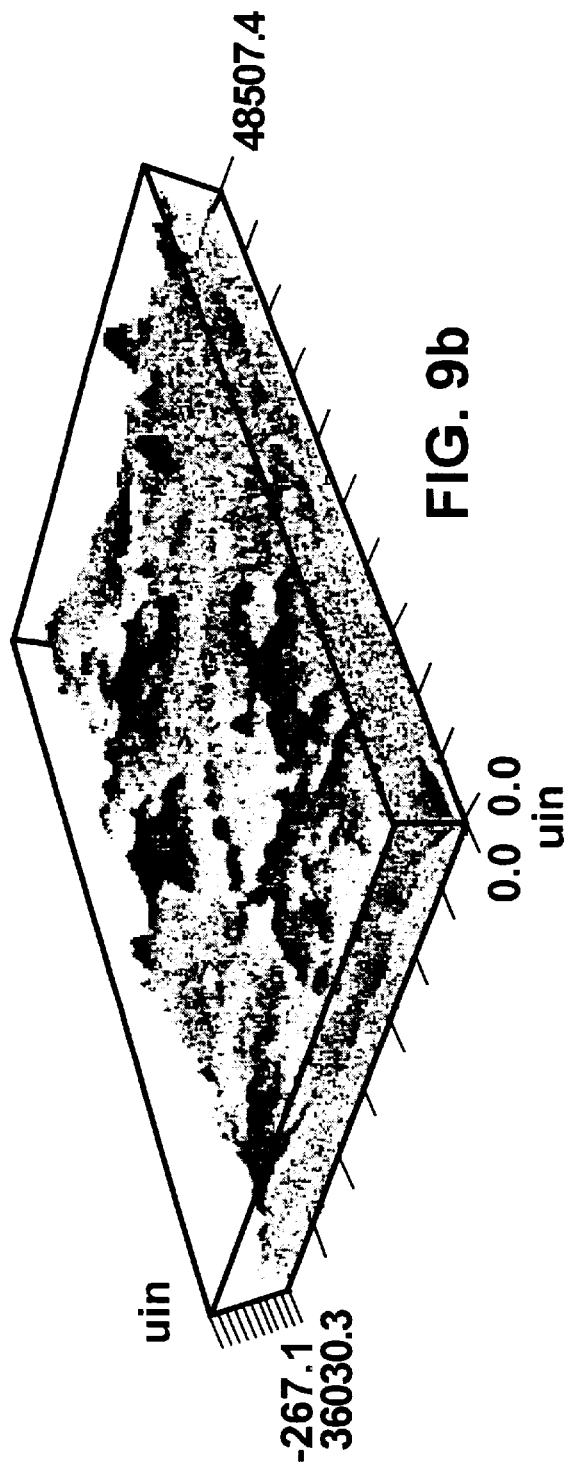
FIG. 9b is an optical surface profile in three dimensions of steel textured by a shot blasting process.

FIG. 9a and FIG. 9b show the optical surface profile of steel textured by processes similar to those mentioned in the '654 patent. The surface of FIG. 9a results from electron discharge technology (EDT) and has an $R_a$ of 41 u in. while the surface in FIG. 9b results from shot blasting and has an $R_a$ of 75 μin. The jagged and irregular surface characteristics indicate that the surfaces should exhibit increased coefficient of friction, but would probably cause excessive wear of any adjacent friction plates. Visually, the surfaces resemble the conventional surfaces shown in FIG. 8a through FIG. 8d rather than the surface of FIG. 4b. The relatively smooth and regular separator plate surface shown in FIG. 4b, however, has an $R_a$ of 27 μin. and the jagged and irregular separator plate surfaces shown in FIG. 8a through FIG. 8b have $R_a$ values ranging between 5.9 μin. and 11 μin.

It is believed, therefore, that two surfaces having the same $R_a$, but which have surfaces which differ in other respects, may exhibit significant differences with respect to, for example, wear and frictional characteristics. In other words, it is believed that measuring $R_a$ does not differentiate separator plates exhibiting significantly different operating characteristics.

Figure 10A:
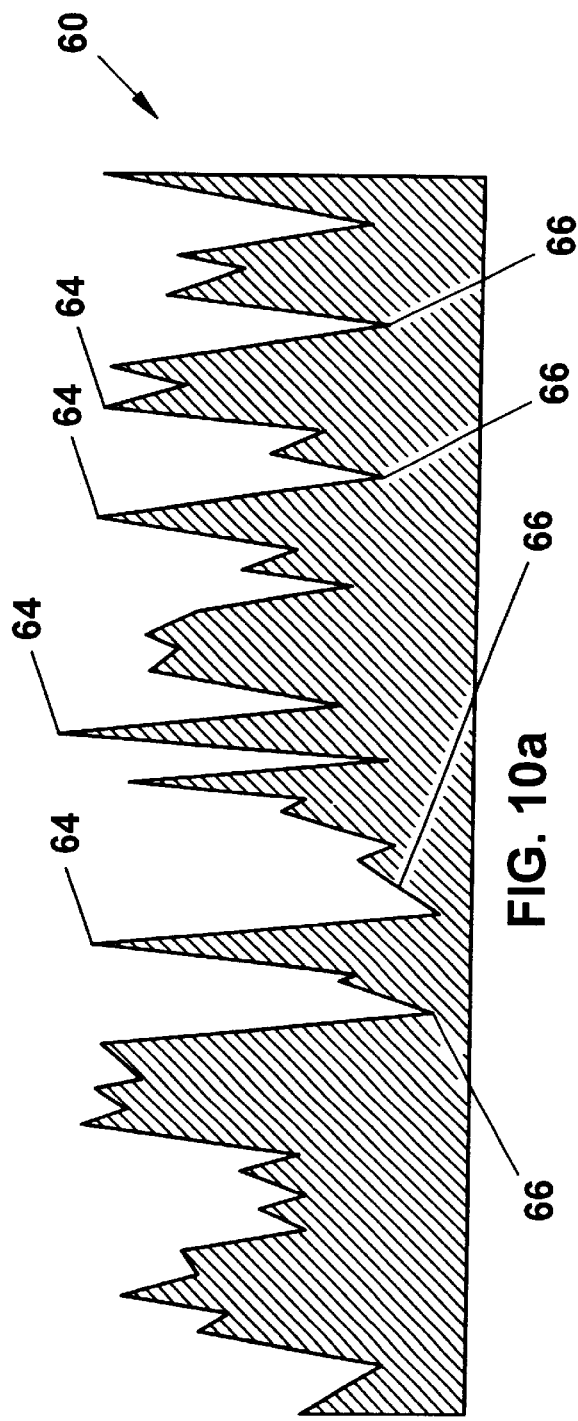
FIG. 10a is an exemplary surface roughness profile.
Figure 10B:
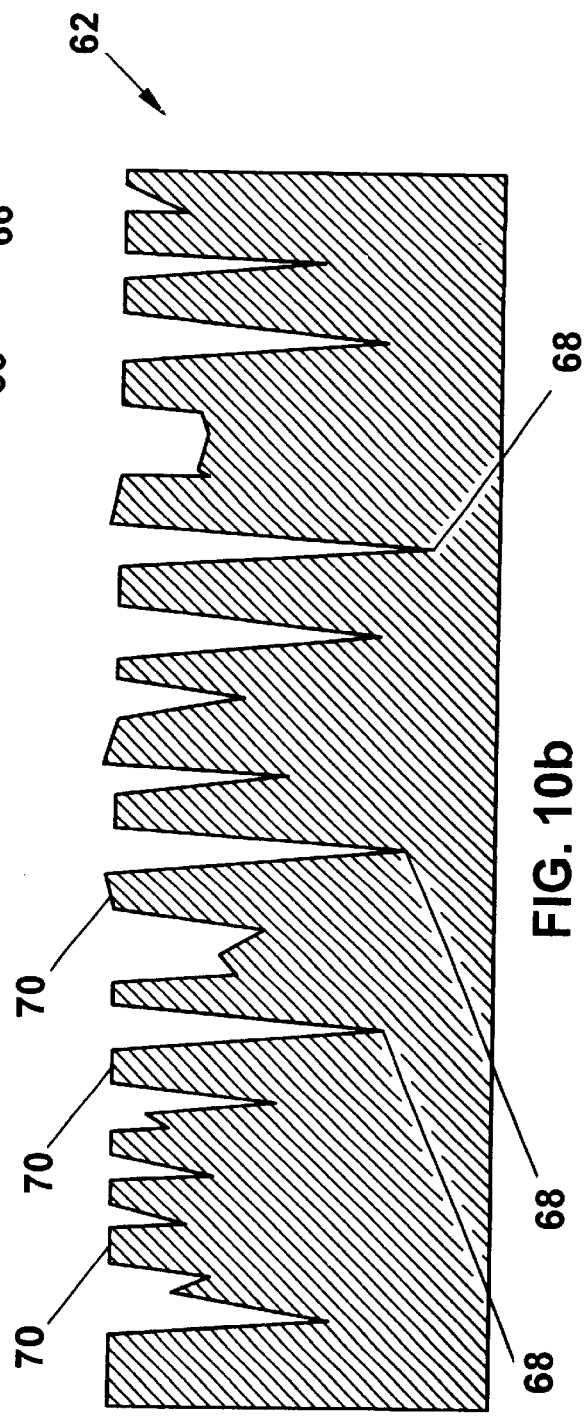

By way of example, graphs of the surface roughness profiles of two exemplary profiles are shown in FIG. 10a and FIG. 10b. Although surface roughness profile 60 of FIG. 10a and surface roughness profile 62 of FIG. 10b exhibit the same average arithmetic roughness ($R_a$) of 2.4 μm, the nature of the surfaces, and hence their characteristics, including oil retention volume, as defined below, are extremely dissimilar. Visual inspection of surface roughness profile 60 reveals a jagged profile with a number of peaks 64 and valleys 66. In contrast, surface roughness profile 62 is characterized by valleys 68 and plateaus 70. Consequently, even though the surfaces share a common $R_a$, it is believed that the jagged peaks of the surface of surface roughness profile 60 would cause significantly more damage to an engaging friction plate compared to the relatively smooth plateaus shown in surface roughness profile 62. Thus, the surface depicted in surface roughness profile 60 would be undesired as a separator plate surface when considering the wear of the friction plate.

The reason that $R_a$ alone does not alert one to the differences between the surfaces in FIG. 10a and FIG. 10b, is that an arithmetic average merely determines a centerline of mass and defines perturbations from that centerline. The nature of the perturbation, whether jagged or plateau-like, is not quantifiable with the $R_a$ parameter alone. Further, no indication of the mass in the peaks or the gaps in the valleys is possible and, as will be discussed below, it is believed that the mass in the peaks and the gaps in the valleys is directly related to operational characteristics. These differences, as exhibited in surface roughness profile 60 and surface roughness profile 62, may be quantified by reference to Deutsche Institut fur Normung e.V. (DIN) 4776 parameters.

The DIN, like the American National Standards Institute (ANSI), is a standards organization. Organizations such as DIN typically perform a facilitation role designed to encourage a common technical language for industry. Consequently, when a standardized parameter is used in industry, it has a universally understood meaning. Therefore, not only do the parameters function as a means of describing the nature of the surface, they may also be used to establish design and manufacturing criteria. In the case of DIN 4776 parameters, "DIN 4776" denotes a specific filter and process which may be used in quantifying the roughness characteristics of a surface.

DIN 4776, which has typically been used in quantifying surfaces such as cylinder bores, incorporates a three step filtering process which is described in more detail in Mummery, *Surface Texture Analysis The Handbook*, Hommelwerke, Gmbh of West Germany. The result of DIN 4776 filtering is a roughness profile without any waviness which is achieved without distorting the surface roughness features of a surface.

Figures 11, 12:
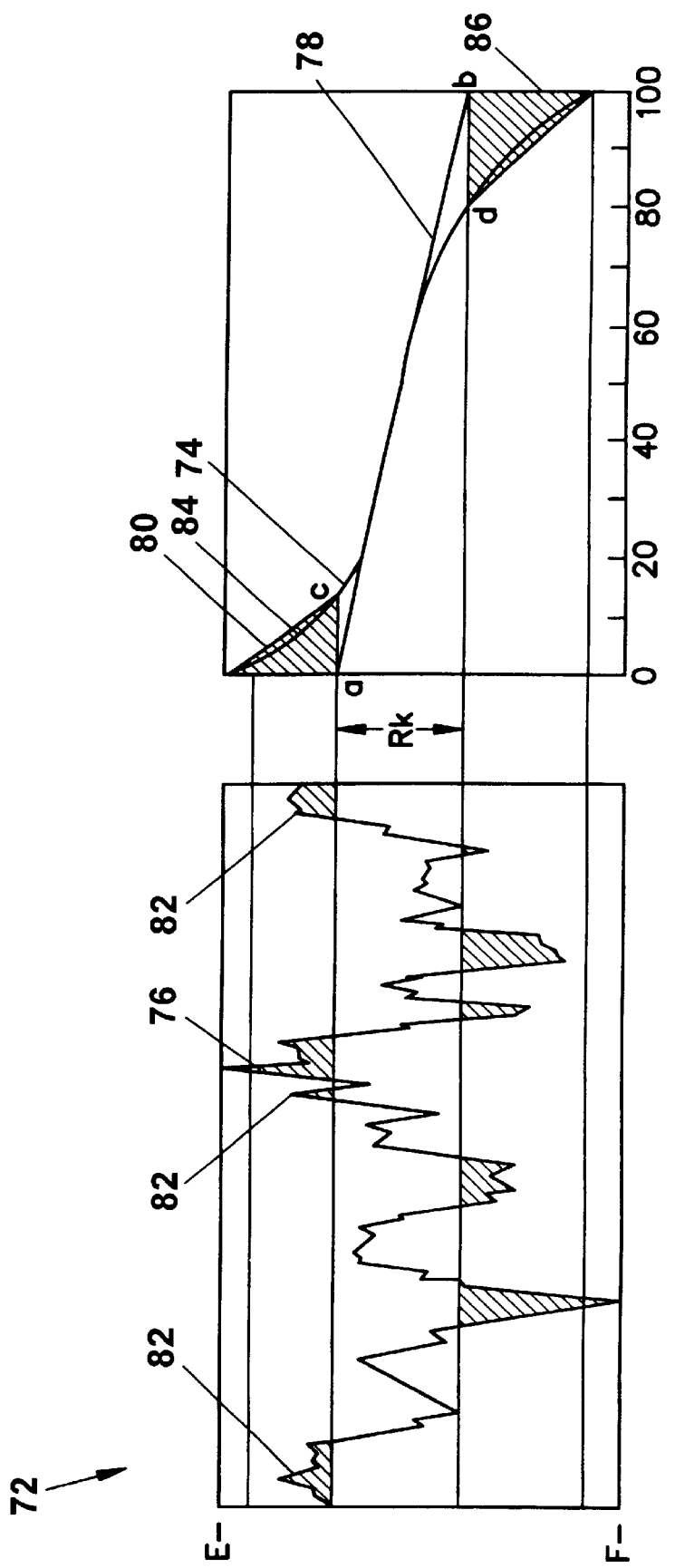
FIG. 11 is an exemplary surface roughness profile.
FIG. 12 is a material ratio curve obtained from the surface roughness profile of FIG. 11.

DIN 4776 parameters are described in reference to FIG. 11 and FIG. 12. FIG. 11 shows an exemplary partial surface roughness profile 72 for a typical surface. FIG. 12 shows a material ratio curve, obtained from the roughness profile of FIG. 11. Such material ratio curves are known as Abbott-Firestone curves, and otherwise referred to as a load curve. Material ratio curve 74 represents the ratio of physical material present along a cross-section of surface roughness profile 72 as the cross-section is moved from the uppermost surface of the object to the lowest valley.

Material ratio curve 74 thus represents the amount of load bearing material available at a given distance from the uppermost surface of the object. Thus, distance E of FIG. 11, which corresponds to the uppermost point of the surface of FIG. 11, corresponds to the 0% point of FIG. 12 as no material is present above peak 76, the tallest point of the surface of FIG. 11. Similarly, at distance F, there is no gap or valley in a cross-section of roughness profile 72 of FIG. 6. Thus, distance F corresponds to the 100% density point of the surface of FIG. 12.

Once material ratio curve 74 is generated, DIN 4776 parameters for surface roughness profile 72 of FIG. 11 may be determined according to the following process. A line spanning 40% of the horizontal axis of material ratio curve 74 is fitted along material ratio curve 74 in order to define the "flattest" portion of material ratio curve 74. In other words, the points at which the shortest rise or fall on the vertical axis for any 40% span on the horizontal axis are established. The 40% span is used to determine the depth of roughness profile 72 of FIG. 11 where the greatest increase in material ratio occurs. Minimum gradient line 78 is drawn through the two points identified above. Minimum gradient line 78 is then extended from the 40% span so that it intercepts the 0% and 100% vertical axis at point a and point b respectively. The vertical distance between point a and point b is called the core roughness depth ($R_k$).

Other DIN 4776 parameters are established after extending horizontal lines from point a and point b to material ratio curve 74. These lines intersect material ratio curve 74 at point c and point d respectively. As will be discussed below, point c is the peak material ratio ($M_1$) and point d is the valley material ratio ($M_2$). The area of peak area 80, which is defined by line ac, the 0% line and material ratio curve 74, is determined by the material in highest peaks 82 of surface roughness profile 72 of FIG. 11. The area of peak area 80 is then converted to a right triangle, shown as shaded area 84, having line ac as its base. The resulting height of shaded area 84 is called the reduced peak height ($R_{PK}$).

A process similar to that of defining $R_{PK}$ is taken to define a reduced valley depth ($R_{VK}$). With respect to valleys, however, the focus changes from the material present at a given depth, to the gaps in material. Consequently, shaded section 86 of FIG. 12 represents the area above material ratio curve 74, to the left of the 100% line and below line db. The resulting height of a right triangle having as its base line db and an area equal to shaded section 86 is the $R_{VK}$.

Referring again to FIG. 10a and FIG. 10b, the usefulness of the above DIN 4776 parameters in differentiating the nature of a surface is apparent. Referring first to FIG. 10a, the surface represented by surface roughness profile 60 has an $R_{PK}$ of 2.6 μm, an $R_k$ of 8.2 μm and an $R_{VK}$ of 2.6 μm. Based on these numbers, the surface should exhibit a number of peaks and valleys, with a transition from peaks into valleys with no base surface from which the peaks extend and the valleys drop. Further, the 'gaps' of the valleys should define roughly the same area as defined by the material in the peaks. Referring to surface roughness profile 74, validates this assessment as peaks 64 and valleys 66 are clearly visible and appear to be of comparable area. Further, there is no well defined surface from which the peaks and valleys diverge.

In contrast, surface roughness profile 62 of FIG. 5b has an $R_{PK}$ of 0.9 μm., an $R_k$ of 1.9 μm and an $R_{VK}$ of 81.9 μm. Based on these values, one would expect surface roughness profile 76 to have pronounced valleys dropping away from a clearly defined surface and very little mass in peaks. Visual inspection of surface roughness profile 76 supports this assessment as there are no significant peaks and valleys 82 drop from well defined plateaus 70.

The visual differences in the nature of surface profiles discussed above are thought to be related to differences between the surfaces in operational characteristics. The above DIN parameters may be used to gain insight into these differences in operational characteristics. A large $R_k$ indicates a gradual increase in material density over a large depth while a small $R_k$ indicates a dense core of material with a rapid transition over a short depth from the peaks to the valleys. Significantly, in applications which depend on some amount of surface roughness, and wherein the material is constantly being worn away, a large $R_k$ is thought to be indicative of long life. Long life is indicated because the amount of material available before the core material has been worn away is increased as $R_k$ is increased. While the following expression is not a DIN parameter, it is believed that an indication of available wear material is given by the following expression:

$$V_u = \frac{R_K(M_2 - M_1)}{2}$$

wherein $V_u$ is the usable material component. The above equation approximates the area underneath material ratio curve 74 between points c and d and above a horizontal line passing through point d. This area represents the amount of material which comprises the useful core of the surface. Of course, it is possible to correct the $R_k$ to an effective $R_k$ in the same fashion described above for the parameters $R_{PK}$ and $R_{VK}$ in order to obtain a more precise value.

A parameter which is derived from $R_{PK}$ is the material filled profile peak area ($V_1$). This parameter, as its name implies, indicates the amount of material present in the peaks. This is material that is removed during the break-in period. The parameter is defined by the area of the triangle defined by $R_{PK}$ and $M_1$. The formula for calculating $V_1$ is given below.

$$V_1 = \frac{R_{PK}(M_1)}{2}$$

wherein $M_1$ is the peak material ratio. Consequently, a small $V_1$ indicates a surface which has a shortened break-in period. Additionally, there will be realized a lesser amount of debris before the surface is worn to a more useful depth. Consequently, the onset of squawk is delayed.

A parameter which is derived from RVK is the oil retention volume ($V_o$). This parameter, as its name implies, indicates the volume of the valleys which is available for retaining oil or some other fluid. The formula for calculating $V_o$ is as follows:

$$V_O = \frac{R_{VK}(100 - M_2)}{2}$$

wherein $M_2$ is the valley material ratio. The availability of a reservoir for retaining oil is believed to be beneficial for several reasons. First, oil is useful in cooling the contact surfaces, thereby extending the life of both the friction plate and the separator plate. Additionally, it is believed that a larger reservoir allows for the removal of more contaminants. Consequently, for a given level of contaminants, a surface comprising a larger $V_o$ should experience less squawk as the contaminants causing squawk are more is easily moved into the reservoirs. This of course extends the useful life of the friction plate and separator plate by reducing the wear of the plates.

It is further contemplated that the availability of large reservoirs will result in improved frictional characteristics. In order to transfer torque, the friction plate and separator plate must come in physical contact, and oil intermediate the plates must be removed. By providing a large reservoir, the oil may be rapidly displaced from the contact area of the plates, allowing for more rapid torque transfer. Further, it is contemplated that at the microscopic level, an extreme amount of pressure is present, even with relatively low pressure applied in chamber 46 of FIG. 1 above. This is because of the relative surface area available for transferring the pressure. Consequently, the fluid may in fact be compressible at these elevated pressures. Therefore, as the size of the reservoirs increase, less pressure is needed to force the oil from between the plates. Consequently, smaller components are needed to operate the clutch pack. For example, less pressure is required to be present in chamber 46.

Additional operational characteristics of a surface may be determined by reference to the ratio of the mean peak height ($R_{PM}$) to mean peak-to-valley height ($R_{z(DIN)}$). $R_{PM}$ is a measure of the height of the highest peaks within a number of adjacent lengths of a surface profile. $R_{z(DIN)}$ is a measure of the height from the same peaks used in calculating $R_{PM}$ to the bottom of the deepest valley over the same areas used in determining $R_{PM}$. The ratio is therefore a measure of the height of the peaks in comparison to the rest of the surface features. A number of less than 0.5 is considered to be indicative of a plateau-like surface, with smaller numbers indicating more resemblance to a plateau. A low $R_{PM}/R_{z(DIN)}$ ratio is thought to be important in exhibiting less wear on an adjacent plate, a reduced break-in period, reduced drag, an improved coefficient of friction and longer life for the clutch pack assembly.

Two other parameters believed to be related to operational characteristics are skewness ($R_{SK}$) and kurtosis ($R_{KU}$). Both parameters are based on the amplitude distribution curve for a surface. The amplitude distribution curve is a graphical representation of the distribution of height over the total profile depth. $R_{SK}$ is the third moment of the amplitude distribution curve and provides an indication of the symmetry between peaks and valleys. Negative $R_{SK}$ indicates a plateau-like surface, and may indicate operational characteristics similar to those indicated by the ratio $R_{PM}/R_{z(DIN)}$.

The $R_{KU}$ is the fourth moment of the amplitude distribution curve and provides an indication of the "sharpness" of a surface. A high $R_{KU}$ indicates a surface with sharp peaks and valleys, while a small $R_{KU}$ indicates a surface with small rounded peaks and valleys. A small $R_{KU}$ in a separator plate is thus thought to be indicative of a surface which will not rip an adjacent plate as well as exhibiting reduced drag and clunk.

Other parameters which may be useful include mean valley depth ($R_{VM}$) which is a measure of the height of the highest peaks within a number of adjacent lengths of a surface profile, maximum peak height ($R_P$) which is a measure of the height of the highest peak within a number of adjacent lengths of a surface profile, maximum valley depth ($R_v$) which is a measure of the depth of the deepest valley within a number of adjacent lengths of a surface profile and maximum height of the profile ($R_T$) which is a measure from the height of the highest peak within a number of adjacent lengths of a surface profile to the depth of the deepest valley within the same adjacent lengths.

Figure 4C:
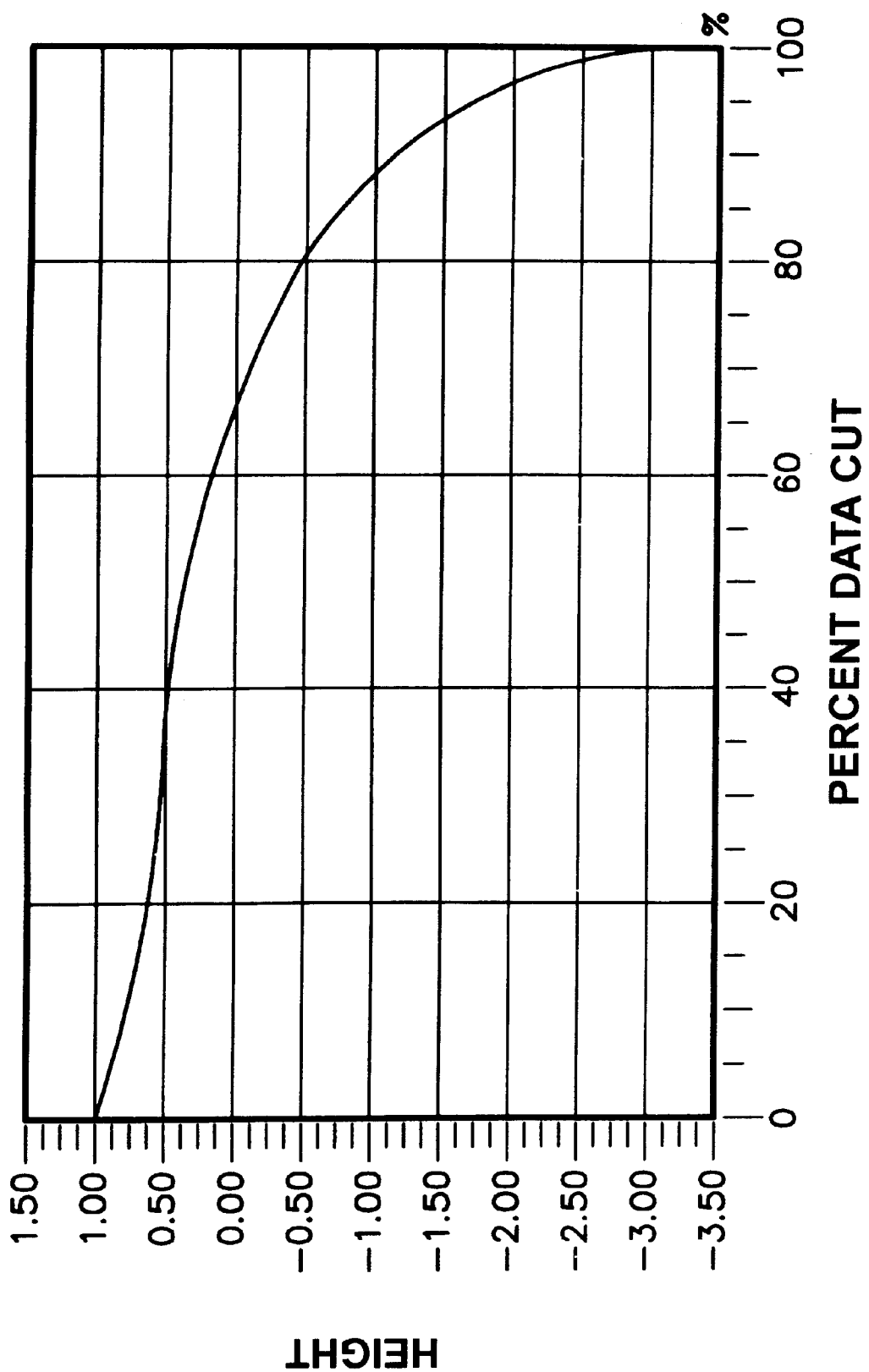
FIG. 4c is a material ratio curve for the separator plate of FIG. 4a and FIG. 4b.

Those of skill in the art will understand that while the above parameters give an indication of features such as the core depth and the nature of the peaks and valleys, the parameters above may be based on a two dimensional measurement of the surface. For a surface such as the separator plate shown in FIG. 4a, consisting of substantially parallel features, a single two dimensional profile could be very unrepresentative of the true nature of the surface. Specifically, a profile along the arrow in FIG. 4a would show relatively minor variations in the surface. This is contrasted with a profile slightly to the right or left of the arrow which would reveal closely packed plateaus and valleys. Consequently, it is preferred to obtain a three dimensional measure of the DIN 4776 parameters. A software package, such as WYKO Vision software version 1.800, commercially available from Veeco Instruments, Inc. of Plainview, N.Y., may be used to analyze an area of a surface. For example the material ratio curve of FIG. 4c is derived from the 0.9 mm by 1.2 mm area shown in FIG. 4a and FIG. 4b. Additionally, analysis should be performed at several locations on the surface in order to determine an average value.

The results of analyzing a number of separator plates according to one embodiment of the present invention are shown in the following table.

TABLE 8

| Parameter | Units | Average | Std. Dev. |
|---|---|---|---|
| $R_a$ | μin | 23.68 | 2.53 |
| $R_g$ | μin | 32.62 | 3.35 |
| $R_{SK}$ | None | −1.66 | 0.23 |
| $R_{KU}$ | None | 7.51 | 1.72 |
| $R_{pm}$ | μin | 82.79 | 20.85 |
| $R_{vm}$ | μin | −181.15 | 21.95 |
| $R_{z(DIN)}$ | μin | 263.95 | 36.97 |
| $R_{pm}/R_{z(DIN)}$ | None | 0.32 | 0.03 |
| $R_p$ | μin | 114.24 | 40.99 |

TABLE 8-continued

| Parameter | Units | Average | Std. Dev. |
|---|---|---|---|
| $R_v$ | μin | −227.94 | 46.72 |
| $R_t$ | μin | 342.18 | 71.55 |
| $R_{PK}$ | μin | 9.4 | 2.29 |
| $R_k$ | μin | 52.14 | 6.13 |
| $R_{VK}$ | μin | 55.57 | 7.25 |
| $M_1$ | % | 5.31 | 0.72 |
| $M_2$ | % | 79.85 | 1.28 |
| $V_U$ | None | 1943 | 220 |
| $V_O$ | None | 560 | 101 |
| $V_1$ | None | 25 | 8 |

In comparison, the results of analyzing conventional separator plates is provided in the following table.

TABLE 9

| Parameter | Units | Average | Std. Dev. |
|---|---|---|---|
| $R_a$ | μin | 7.15 | 0.81 |
| $R_g$ | μin | 9.86 | 1.24 |
| $R_{SK}$ | None | −1.00 | 0.45 |
| $R_{KU}$ | None | 9.32 | 3.0 |
| $R_{pm}$ | μin | 40.31 | 7.39 |
| $R_{vm}$ | μin | −67.93 | 10.81 |
| $R_{z(DIN)}$ | μin | 108.24 | 14.82 |
| $R_{pm}/R_{z(DIN)}$ | None | 0.37 | 0.06 |
| $R_p$ | μin | 54.2 | 17.32 |
| $R_v$ | μin | −96.26 | 19.81 |
| $R_t$ | μin | 150.46 | 31.88 |
| $R_{PK}$ | μin | 6.72 | 1.00 |
| $R_k$ | μin | 19.90 | 2.10 |
| $R_{VK}$ | μin | 11.46 | 2.73 |
| $M_1$ | % | 9.65 | 88.35 |
| $M_2$ | % | 88.35 | 1.19 |
| $V_U$ | None | 783 | 254 |
| $V_O$ | None | 66.75 | 6.2 |
| $V_1$ | None | 32 | 11 |

Comparison of the above tables reveals that the embodiment of the invention analyzed exhibits an improvement in $V_o$ of over 700%. $V_u$ and $V_1$ are likewise significantly improved by an increase of almost 150% in $V_u$ and a 22% decrease in $V_1$. Importantly, the improved performance provided by this embodiment of the present invention, as indicated by the above parameters, does not appear to be achieved by sacrificing the overall performance of the clutch pack assembly or the performance of the friction plate. $R_{KU}$ is decreased by over 19%, indicating less wear of the friction plates during operation. Additionally, this embodiment of the present invention has improved uniformity in the surface as evidence by the substantially reduced standard deviation for $R_{KU}$. This pattern is repeated in the $R_{SK}$ and $R_{pm}/R_{z(DIN)}$ parameters. Thus, while the conventional separator plate exhibits some plateau-like features, the present invention substantially improves the plateau-like features of the surface, and in the embodiment above analyzed, to a dramatic extent.

Accordingly, the results shown in Table 8 when compared with Table 9 indicate that the embodiment of the present invention analyzed will exhibit reduced parasitic drag, thus reducing the occurrence and magnitude of clunk. The invention further is expected to reduce squawk, provide improved dynamic and static coefficients of friction while producing less wear on friction plate. The present invention is thus expected to exhibit significantly improved durability for the clutch pack assembly by extending the life of the friction plate and providing a separator plate having a longer life compared to the prior art.

Although the separator plate described herein was textured on both surfaces, those of skill in the art will understand that the present invention may be practiced with a separator plate textured on only one surface. For example, in one embodiment known in the art as a single sided friction plate, the separator plate and the friction plate are combined into a single plate. In plates of this type, one side of the plate is configured as a friction plate, for example, by having friction material applied, while the opposite side may be configured as a separator plate. Plates of this type may still be textured in accordance with the present invention and realize benefits of the present invention as described herein. Therefore, single sided plates incorporating the surface texture described herein are within the scope of the present invention.

Further, while the preferred embodiment as described above was a solid steel separator plate, those of skill in the art will understand that the present invention may be practiced with other types of separator plates including, but not limited to steel plates coated with wear resistant material such as ceramics, plates comprises solely of ceramics, and plates made from sintered or powdered metals. Additionally, alternate means of manufacture may be used in place of the preferred means including means which incorporate grinding or polishing to achieve the final texture.

Those of skill in the art will further understand that the present invention is useful in applications other than the preferred embodiment as described above. By way of example, but not of limitation, the present invention may be useful in numerous applications wherein frictional members are incorporated including clutches in torque converters, brake bands, differentials, friction bands and the like. Further, the order of the plates within the clutch pack assembly as well as the driven shaft and the rotating shaft may be alternated without detracting from the advantages of the present invention. These applications and other obvious variants are considered to be within the scope of the present invention.

Those of skill in the art will realize that as described herein, the present invention provides significant advantages over the prior art. Embodiments of the invention, which may be textured during cold rolling of the sheet steel, exhibit reduced drag. A separator plate according to the present invention is also believed to reduced wear of the friction plate, provide more gradual shift characteristic changes, reduce squawk and/or reduced clunk. A separator plate according to the present invention is also believed to decrease the break-in period while providing improved torque transmission. One embodiment of a process for producing a separator plate according to the present invention is easily incorporated into traditional methods of manufacture and the resulting separator plate does not require redesign of a clutch pack assembly. Other objects and features of the present invention will be apparent to those of skill in the art in consideration of the above description and the accompanying drawings.

what is claimed is:

1. A separator plate for use in an automatic transmission and the like, wherein friction plates are interleaved with separator plates, comprising:
a first surface and a second surface substantially parallel to each other, at least one of the first and second surfaces having a texture to improve operating characteristics compared to conventional separator plates, the texture of the at least one surface characterized by a regular pattern of recesses, the at least one surface being textured by cold working.

2. A separator plate according to claim 1, wherein both the first and the second surface have a texture characterized by a regular pattern of recesses.

3. The separator plate of claim 1, the at least one surface being textured by rolling with a work roll having a surface with a pattern formed thereon.

4. The separator plate of claim wherein the regular pattern of recesses comprises recesses which are substantially parallel.

5. The separator plate of claim 4, wherein the substantially parallel recesses define a deterministic substantially straight pattern.

6. The separator plate of claim 4, the at least one surface having an average material filled profile peak area ($V_1$) less than about 32, $V_1$ being computed according to the following equation:

$$V_1 = \frac{R_{PK}(M_1)}{2}$$

wherein $M_1$ is the peak material ratio; and $R_{PK}$ is the reduced peak height calculated in microinches.

7. The separator plate of claim 4, the at least one surface having an average oil retention volume($V_o$) greater than about 67, $V_o$ being computed according to the following equation:

$$V_O = \frac{R_{VK}(100 - M_2)}{2}$$

wherein $M_2$ is the valley material ratio; and $R_{VK}$ is the reduced valley depth calculated in microinches.

8. The separator plate of claim 4, the at least one surface having an average usable material volume($V_u$) greater than about 785, $V_u$ being computed according to the following equation:

$$V_u = \frac{R_K(M_2 - M_1)}{2}$$

wherein $M_2$ is the valley material ratio;

$M_1$ is the peak material ratio; and $R_K$ is the core depth calculated in microinches.

9. The separator plate of claim 4, the at least one surface characterized by an average ratio of mean peak height ($R_{PM}$) to mean peak-to-valley height ($R_{z(DIN)}$) of less than about 0.37.

10. The separator plate of claim 4, the at least one surface characterized by an average skewness ($R_{SK}$) less than about −1, where $R_{SK}$ is the third moment of the graphical representation of the distribution of height (amplitude distribution curve) over the total profile depth.

11. The separator plate of claim the at least one surface characterized by an average kurtosis ($R_{KU}$) less than about 9, where $R_{KU}$ is the fourth moment of the graphical representation of the distribution of height (amplitude distribution curve) over the total profile depth.

12. The separator plate of claim 4, the at least one surface characterized by at least one parameter from the following group:

a) an average material filled profile peak area ($V_1$) less than about 32, $V_1$ being computed according to the equation:

$$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) greater than about 67, $V_o$ being computed according to the equation:

$$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) greater than about 785, $V_u$ being computed according to the equation:

$$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about –1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

13. The separator plate of claim 4 the at least one surface characterized by at least one parameter from the following group:

a) an average material filled profile peak area ($V_1$) of about 25, $V_1$ being computed according to the equation:

$$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) of about 560, $V_o$ being computed according to the equation:

$$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) of about 1943, $V_u$ being computed according to the equation:

$$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) of about –1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

14. The separator plate of claim 4, wherein the separator plate comprises at least one of the following group of materials:
SAE 1008;
SAE 1010;
SAE 1020; and
SAE 1035.

15. A separator plate for use in an automatic transmission and the like, wherein friction plates are interleaved with separator plates, comprising:
a first surface and a second surface substantially parallel to each other, at least one of the first and second surfaces having a texture to improve operating characteristics compared to conventional separator plates, the texture of the at least one surface characterized by a regular pattern of recesses, wherein the regular pattern of recesses comprises recesses which are curvilinear, the curvilinear recesses defining a deterministic bi-dimensional pattern of island-like features.

16. The separator plate of claim 15, wherein the regular deterministic bi-dimensional pattern has the form of unit cells of island-like features, the unit cells of island-like features being in a centered regular hexagon pattern.

17. The separator plate of claim 16, wherein the regular deterministic bi-dimensional pattern comprises an interference pattern having a longitudinal wavelength and a transverse wavelength, the interference pattern wavelengths in the longitudinal direction and in the transverse direction being less than about 1.5 mm.

18. A separator plate for use in an automatic transmission and the like, wherein friction plates are interleaved with separator plates, comprising:
a first surface and a second surface substantially parallel to each other, at least one of the first and second surfaces having a texture to improve operating characteristics compared to conventional separator plates, the texture of the at least one surface characterized by a regular pattern of recesses, the at least one surface having an average oil retention volume($V_o$) greater than about 67, $V_o$ being computed according to the following equation:

$$V_O = \frac{R_{VK}(100 - M_2)}{2}$$

wherein $M_2$ is the valley material ratio; and
$R_{VK}$ is the reduced valley depth calculated in microinches.

19. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface having an average usable material volume($V_u$) greater than about 785, $V_u$ being computed according to the following equation:

$$V_u = \frac{R_K(M_2 - M_1)}{2}$$

wherein $M_2$ is the valley material ratio;
$M_1$ is the peak material ratio; and
$R_K$ is the core depth calculated in microinches.

20. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by an average ratio of mean peak height ($R_{PM}$) to mean peak-to-valley height ($R_{z(DIN)}$) of less than about 0.37.

21. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by an average skewness ($R_{SK}$) less than about −1, where $R_{SK}$ is the third moment of the graphical representation of the distribution of height (amplitude distribution curve) over the total profile depth.

22. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by an average kurtosis ($R_{KU}$) less than about 9, where $R_{KU}$ is the fourth moment of the graphical representation of the distribution of height (amplitude distribution curve) over the total profile depth.

23. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by at least one parameter from the following group:

a) an average material filled profile peak area ($V_1$) less than about 32, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) greater than about 67, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) greater than about 785, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

24. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by at least one parameter from the following group:

a) an average material filled profile peak area ($V_1$) of about 25, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) of about 560, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) of about −1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

25. The separator plate of claim 15, wherein the separator plate comprises at least one of the following group of materials:
SAE 1008;
SAE 1010;
SAE 1020; and
SAE 1035.

26. A method of manufacturing a separator plate for use in an automatic transmission and the like from a stock material having at least one surface, the method comprising the following steps:
providing a stock material;
texturing the at least one surface of the stock material such that the at least one surface has a plateau-like surface profile; and
cutting from the stock material a separator plate.

27. The method of claim 26, wherein the step of texturing comprises the step of texturing by cold working.

28. The method of claim 27, wherein the step of texturing comprises the steps of:
providing a cold rolling mill, wherein the rolling mill comprises at least one work roll textured in a regular deterministic bi-dimensional pattern; and
passing the stock material through the cold rolling mill.

29. The method of claim 28, wherein the step of providing a cold rolling mill comprises the step of providing a work roll wherein the regular deterministic bi-dimensional pattern is in the form of a centered regular hexagon or square unit cell of craters, each crater substantially circumscribed by a protuberance.

30. The method of claim 29, wherein said pattern has an interference pattern of wavelengths in a longitudinal direction and in a traverse direction of the roll of less than about 1.5 mm.

31. The method of claim 26, wherein the step of texturing the at least one surface such that the at least one surface of stock results in the at least one surface having at least one parameter selected from the following group:

a) an average material filled profile peak area ($V_1$) less than about 32, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) greater than about 67, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) greater than about 785, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

32. The method of claim 26, wherein the step of texturing the at least one surface such that the at least one surface of stock results in the at least one surface having at least one parameter selected from the following group:

a) an average material filled profile peak area ($V_1$) of about 25, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) of about 560, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) Of about −1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

33. The method of claim 32, wherein the stock material comprises at least one of the following group of materials:
SAE 1008;
SAE 1010;
SAE 1020; and
SAE 1035.

34. The method of claim 26, wherein the step of texturing the at least one surface comprises the steps of:
texturing the first surface; and
texturing the second surface.

35. A method of manufacturing a separator plate for use in an automatic transmission and the like from a stock material, the method comprising the following steps:
shaping from the stock material a separator plate having a first surface and a second surface substantially parallel to each other; and
texturing the separator plate such that at least one of the first and second surface is characterized by a regular pattern of recesses, wherein the step of texturing comprises the step of texturing by cold working the at least one surface.

36. The method of claim 35 wherein the step of texturing comprises:
texturing the first surface of the separator plate; and
texturing the second surface of the separator plate, such that the first surface and the second surface are characterized by a regular pattern of recesses.

37. The method of claim 35, wherein the step of texturing comprises the step of texturing the at least one surface with a regular deterministic bi-dimensional pattern.

38. The method of claim 37, wherein the regular deterministic bi-dimensional pattern is in the form of a centered regular hexagon or square unit cell of island-like features substantially circumscribed by curvilinear recesses.

39. The method of claim 38, wherein the pattern comprises an interference pattern of wavelengths in a longitudinal direction and in a traverse direction of the roll of less than about 1.5 mm.

40. The method of claim 35, wherein the regular pattern of recesses is in the form of substantially parallel recesses.

41. A method of manufacturing a separator plate for use in an automatic transmission and the like from a stock material, the method comprising the following steps:
shaping from the stock material a separator plate having a first surface and a second surface substantially parallel to each other; and
texturing the separator plate such that at least one of the first and second surface is characterized by a regular pattern of recesses, wherein the step of texturing comprises the step of texturing the at least one surface such that the at least one surface characterized by at least one parameter from the following group:

a) an average material filled profile peak area ($V_1$) less than about 32, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume ($V_o$) greater than about 67, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume ($V_u$) greater than about 785, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

42. A method of manufacturing a separator plate for use in an automatic transmission and the like from a stock material, the method comprising the following steps:
shaping from the stock material a separator plate having a first surface and a second surface substantially parallel to each other; and
texturing the separator plate such that at least one of the first and second surface is characterized by a regular pattern of recesses, wherein the step of texturing comprises the step of texturing the at least one surface such that the at least one surface characterized by at least one parameter from the following group:

a) an average material filled profile peak area ($V_1$) of about 25, $V_1$ being computed according to the equation $$V_1 = \frac{R_{PK}(M_1)}{2}$$

wherein $M_1$ is the peak material ratio, and
$R_{PK}$ is the reduced peak height calculated in microinches;
b) an average oil retention volume($V_o$) of about 560, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;
c) an average usable material volume($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;
d) an average ratio of mean peak height ($R_{PM}$) to mean peak-to-valley height ($R_{z(DIN)}$) of about 0.32;
e) an average skewness ($R_{SK}$) of about −1.66, where $R_{SK}$ is the third moment of the graphical representation of the distribution of height (amplitude distribution curve) over the total profile depth; and
f) an average kurtosis ($R_{KU}$) of about 7.5, where $R_{KU}$ is the fourth moment of the graphical representation of the distribution of height (amplitude distribution curve) over the total profile depth.

43. The method of claim 42, wherein the stock material comprises at least one of the following group of materials:
SAE 1008;
SAE 1010;
SAE 1020; and
SAE 1035.

44. In a motorized vehicle having an automatic clutch, a separator plate comprising;
a first surface and a second surface substantially parallel to each other, at least one of the first and second surfaces having a texture to improve operating characteristics compared to conventional separator plates, the texture of the at least one surface characterized by a regular pattern of recesses, the at least one surface being textured by cold working.

45. A separator plate according to claim 44, both the first and the second surface having a texture characterized by a regular pattern of recesses.

46. The separator plate of claim 44, the at least one surface being textured by rolling with a work roll having a pattern thereon.

47. In a motorized vehicle having an automatic clutch, a separator plate comprising;
a first surface and a second surface substantially parallel to each other, at least one of the first and second surfaces having a texture to improve operating characteristics compared to conventional separator plates, the texture of the at least one surface characterized by a regular pattern of recesses, wherein the regular pattern of recesses comprises recesses which are curvilinear, the curvilinear recesses defining a regular deterministic bi-dimensional pattern of island-like features.

48. The separator plate of claim 47, wherein the regular deterministic bi-dimensional pattern has the form of unit cells of island-like features substantially circumscribed by curvilinear recesses, the unit cells being a centered regular hexagon.

49. The separator plate of claim wherein the regular deterministic bi-dimensional pattern comprises an interference pattern having a longitudinal wavelength and a transverse wavelength, the interference pattern wavelengths in the longitudinal direction and in the transverse direction being less than about 1.5 mm.

50. In a motorized vehicle having an automatic clutch, a separator plate comprising;
a first surface and a second surface substantially parallel to each other, at least one of the first and second surfaces having a texture to improve operating characteristics compared to conventional separator plates, the texture of the at least one surface characterized by a regular pattern of recesses, the at least one surface having an average material filled profile peak area ($V_1$) less than about 32, $V_1$ being computed according to the following equation:

$$V_1 = \frac{R_{PK}(M_1)}{2}$$

wherein $M_1$ is the peak material ratio; and
$R_{PK}$ is the reduced peak height calculated in microinches.

51. In a motorized vehicle having an automatic clutch, a separator plate comprising;
a first surface and a second surface substantially parallel to each other, at least one of the first and second surfaces having a texture to improve operating characteristics compared to conventional separator plates, the texture of the at least one surface characterized by a regular pattern of recesses, the at least one surface having an average oil retention volume($V_o$) greater than about 67, $V_o$ being computed according to the following equation:

$$V_O = \frac{R_{VK}(100 - M_2)}{2}$$

wherein $M_2$ is the valley material ratio; and
$R_{VK}$ is the reduced valley depth calculated in microinches.

52. In a motorized vehicle having an automatic clutch, a separator plate comprising;
a first surface and a second surface substantially parallel to each other, at least one of the first and second surfaces having a texture to improve operating characteristics compared to conventional separator plates, the texture of the at least one surface characterized by a regular pattern of recesses, the at least one surface having an average usable material volume($V_u$) greater than about 785, $V_u$ being computed according to the following equation:

$$V_u = \frac{R_K(M_2 - M_1)}{2}$$

wherein $M_2$ is the valley material ratio;
$M_1$ is the peak material ratio; and
$R_K$ is the core depth calculated in microinches.

53. In a motorized vehicle having an automatic clutch, a separator plate comprising;
a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by an average ratio of mean peak height ($R_{PM}$) to mean peak-to-valley height ($R_{z(DIN)}$) of less than about 0.37.

54. In a motorized vehicle having an automatic clutch, a separator plate comprising;

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by an average skewness ($R_{SK}$) less than about −1, where $R_{SK}$ is the third moment of the graphical representation of the distribution of height (amplitude distribution curve) over the total profile depth.

55. In a motorized vehicle having an automatic clutch, a separator plate comprising;

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by an average kurtosis ($R_{KU}$) less than about 9, where $R_{KU}$ is the fourth moment of the graphical representation of the distribution of height (amplitude distribution curve) over the total profile depth.

56. In a motorized vehicle having an automatic clutch, a separator plate comprising;

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by at least one parameter from the following group:

a) an average material filled profile peak area ($V_1$) less than about 32, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume($V_o$) greater than about 67, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) greater than about 785, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

57. In a motorized vehicle having an automatic clutch, a separator plate comprising;

a first surface and a second surface substantially parallel to each other, at least one of the first and second surfaces having a texture to improve operating characteristics compared to conventional separator plates, the texture of the at least one surface characterized by a regular pattern of recesses, the at least one surface characterized by at least one parameter from the following group:

a) an average material filled profile peak area ($V_1$) of about 25, $V_1$ being computed according to the equation $$V_1 = \frac{R_{PK}(M_1)}{2}$$

wherein $M_2$ is the peak material ratio, and
$R_{PK}$ is the reduced peak height calculated in microinches;

b) an average oil retention volume($V_o$) of about 560, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) of about −1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

58. The separator plate of claim 57, wherein the stock material comprises at least one of the following group of materials:

SAE 1008;
SAE 1010;
SAE 1020; and
SAE 1035.

59. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface being textured by cold working.

60. A separator plate according to claim 59, both the first and the second surface having a texture characterized by a regular pattern of recesses.

61. The separator plate of claim 59 the at least one surface being textured by rolling with a work roll having a pattern thereon.

62. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, wherein the regular pattern of recesses comprises recesses which are curvilinear, the curvilinear recesses defining a deterministic bi-dimensional pattern of island-like features.

63. The separator plate of claim 62, wherein the regular deterministic bi-dimensional pattern has the form of unit cells of island-like features, the unit cells of island-like features being a centered regular hexagon.

64. The separator plate of claim 63 wherein the regular deterministic bi-dimensional pattern comprises an interference pattern having a longitudinal wavelength and a transverse wavelength, the interference pattern wavelengths in the longitudinal direction and in the transverse direction being less than about 1.5 mm.

65. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface having an average material filled profile peak area ($V_1$) less than about 32, $V_1$ being computed according to the following equation:

$$V_1 = \frac{R_{PK}(M_1)}{2}$$

wherein $M_1$ is the peak material ratio; and $R_{PK}$ is the reduced peak height calculated in microinches.

66. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface having an average oil retention volume($V_o$) greater than about 67, $V_o$ being computed according to the following equation:

$$V_O = \frac{R_{VK}(100 - M_2)}{2}$$

wherein $M_2$ is the valley material ratio; and $R_{VK}$ is the reduced valley depth calculated in microinches.

67. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface having an average usable material volume($V_u$) greater than about 785, $V_u$ being computed according to the following equation:

$$V_u = \frac{R_K(M_2 - M_1)}{2}$$

wherein $M_2$ is the valley material ratio;

$M_1$ is the peak material ratio; and $R_K$ is the core depth calculated in microinches.

68. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface characterized by an average ratio of mean peak height ($R_{PM}$) to mean peak-to-valley height ($R_{z(DIN)}$) of less than about 0.37.

69. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface characterized by an average skewness ($R_{SK}$) less than about −1, where $R_{SK}$ is the third moment of the graphical representation of the distribution of height (amplitude distribution curve) over the total profile depth.

70. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface characterized by an average kurtosis ($R_{KU}$) less than about 9, where $R_{KU}$ is the fourth moment of the graphical representation of the distribution of height (amplitude distribution curve) over the total profile depth.

71. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface characterized by at least one parameter from the following group:
a) an average material filled profile peak area ($V_1$) less than about 32, $V_1$ being computed according to the equation $$V_1 = \frac{R_{PK}(M_1)}{2}$$

wherein $M_1$ is the peak material ratio, and $R_{PK}$ is the reduced peak height calculated in microinches;

b) an average oil retention volume($V_o$) greater than about 67, $V_o$ being computed according to the equation $$V_O = \frac{R_{VK}(100 - M_2)}{2}$$

wherein $M_2$ is the valley material ratio, and $R_{VK}$ is the reduced valley depth calculated in microinches;

c) an average usable material volume($V_u$) greater than about 785, $V_u$ being computed according to the equation $$V_u = \frac{R_K(M_2 - M_1)}{2}$$

wherein $M_2$ is the valley material ratio, $M_1$ is the peak material ratio, and $R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

72. In a clutch pack assembly wherein friction plates are interleaved with separator plates, the friction plates being splined to a first rotatable member and the separator plates being splined to a second member, the friction plates engageable with the separator plates, an improved separator plate, the improvement comprising that each separator plate has a first surface and a second surface substantially parallel to each other, at least one of the first and second surfaces having a texture to improve operating characteristics compared to conventional separator plates, the at least one surface texture characterized by a regular pattern of recesses, the at least one surface characterized by at least one parameter from the following group:
a) an average material filled profile peak area ($V_1$) of about 25, $V_1$ being computed according to the equation $$V_1 = \frac{R_{PK}(M_1)}{2}$$

wherein $M_1$ is the peak material ratio, and $R_{PK}$ is the reduced peak height calculated in microinches;

b) an average oil retention volume($V_o$) of about 560, $V_o$ being computed according to the equation $$V_O = \frac{R_{VK}(100 - M_2)}{2}$$

wherein $M_2$ is the valley material ratio, and $R_{VK}$ is the reduced valley depth calculated in microinches;

c) an average usable material volume($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) of about –1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

73. The separator plate of claim 72, wherein the separator plate comprises at least one of the following group of materials:

SAE 1008;
SAE 1010;
SAE 1020; and
SAE 1035.

74. In a wet, multi-disc, friction engaging device comprising a first group of frictional members and a second group of frictional members, the first group of frictional members having a coefficient of friction greater than that of the frictional members of the second group, the improvement comprising that each of the second group of frictional members has a first surface and a second surface substantially parallel to each other, at least one of the first and second surfaces having a texture to improve operating characteristics compared to conventional frictional members, the texture of the at least one surface characterized by a regular pattern of recesses.

75. A wet, multi-disc, friction engaging device according to claim 74, both the first and the second surface having a texture characterized by a regular pattern of recesses.

76. The wet, multi-disc, friction engaging device of claim 74, the at least one surface being textured by cold working.

77. The wet, multi-disc, friction engaging device of claim 76, the at least one surface being textured by rolling with a work roll having a pattern thereon.

78. The wet, multi-disc, friction engaging device of claim 74, wherein the regular pattern of recesses comprises recesses which are curvilinear, the curvilinear recesses defining a deterministic bi-dimensional pattern of island-like features.

79. The wet, multi-disc, friction engaging device of claim 78, wherein the regular deterministic bi-dimensional pattern of island-like features has the form of unit cells of island-like features, the unit cells of island-like features being a centered regular hexagon.

80. A The wet, multi-disc, friction engaging device of claim 79, wherein the regular deterministic bi-dimensional pattern comprises an interference pattern having a longitudinal wavelength and a transverse wavelength, the interference pattern wavelengths in the longitudinal direction and in the transverse direction being less than about 1.5 mm.

81. The wet, multi-disc, friction engaging device of claim 74, the at least one surface having an average material filled profile peak area ($V_1$) less than about 32, $V_1$ being computed according to the following equation:

$$V_1 = \frac{R_{PK}(M_1)}{2}$$

wherein $M_1$ is the peak material ratio; and
$R_{PK}$ is the reduced peak height calculated in microinches.

82. The wet, multidisc, friction engaging device of claims 74, the at least one surface having an average oil retention volume ($V_o$) greater than about 67, $V_o$ being computed according to the following equation:

$$V_O = \frac{R_{VK}(100 - M_2)}{2}$$

wherein $M_2$ is the valley material ratio; and
$R_{VK}$ is the reduced valley depth calculated in microinches.

83. The wet, multi-disc, friction engaging device of claim 74, the at least one surface having an average usable material volume ($V_u$) greater than about 785, $V_u$ being computed according to the following equation:

$$V_u = \frac{R_K(M_2 - M_1)}{2}$$

wherein $M_2$ is the valley material ratio;
$M_1$ is the peak material ratio; and
$R_K$ is the core depth calculated in microinches.

84. The wet, multi-disc, friction engaging device of claim 74, the at least one surface characterized by an average ratio of mean peak height ($R_{PM}$) to mean peak-to-valley height ($R_{z(DIN)}$) of less than about 0.37.

85. The separator plate of claim 74, the at least one surface characterized by an average skewness ($R_{SK}$) less than about –1, where $R_{SK}$ is the third moment of the graphical representation of the distribution of height (amplitude distribution curve) over the total profile depth.

86. The wet, multi-disc, friction engaging device of claim 74, the at least one surface characterized by an average kurtosis ($R_{KU}$) less than about 9, where $R_{KU}$ is the fourth moment of the graphical representation of the distribution of height (amplitude distribution curve) over the total profile depth.

87. The wet, multi-disc, friction engaging device of claim 74, the at least one surface characterized by at least one parameter from the following group:

a) an average material filled profile peak area ($V_1$) less than about 32, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume ($V_o$) greater than about 67, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) greater than about 785, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

88. The wet, multidisc, friction engaging device of claim 74, the at least one surface characterized by at least one parameter from the following group:

a) an average material filled profile peak area ($V_1$) of about 25, $V_1$ being computed according to the equation $$V_1 = \frac{R_{PK}(M_1)}{2}$$

wherein $M_1$ is the peak material ratio, and
$R_{PK}$ is the reduced peak height calculated in microinches;

b) an average oil retention volume($V_1$) of about 560, $V_o$ being computed according to the equation $$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) of about −1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

89. The wet, multidisc, friction engaging device of claim 74, wherein the separator plate comprises at least one of the following group of materials:

SAE 1008;
SAE 1010;
SAE 1020; and
SAE 1035.

90. A wet, multi-disc, frictional engagement device comprising a first group of frictional members and a second group of frictional members, the first group of frictional members having at least one surface with a friction enhancing material bonded thereto, the second group of frictional members comprising, a first surface and a second surface substantially parallel to each other, at least one of the surfaces having a texture comprising a substantially regular pattern of recesses.

91. A method of manufacturing a separator plate for use in an automatic transmission and the like from a stock material having at least one surface, the method comprising the following steps:

providing a stock material;

texturing the at least one surface of the stock material such that the at least one surface has a surface profile comprised of substantially parallel recesses; and cutting from the stock material a separator plate.

92. The method of claim 91, wherein the step of texturing comprises the step of texturing by cold working.

93. The method of claim 92, wherein the step of texturing comprises the steps of:

providing a cold rolling mill, wherein the rolling mill comprises at least one work roll textured in a pattern of substantially parallel protuberances; and passing the stock material through the cold rolling mill.

94. The method of claim 91, wherein the step of texturing the at least one surface such that the at least one surface of stock results in the at least one surface having at least one parameter selected from the following group:

a) an average material filled profile peak area ($V_1$) less than about 32, $V_1$ being computed according to the equation:

$$V_1 = \frac{R_{PK}(M_1)}{2}$$

wherein $M_1$ is the peak material ratio, and
$R_{PK}$ is the reduced peak height calculated in microinches;

b) an average oil retention volume($V_O$) greater than about 67, $V_o$ being computed according to the equation:

$$V_O = \frac{R_{VK}(100 - M_2)}{2}$$

wherein $M_2$ is the valley material ratio, and
$R_{VK}$ is the reduced valley depth calculated in microinches;

c) an average usable material volume($V_u$) greater than about 785, $V_u$ being computed according to the equation:

$$V_u = \frac{R_K(M_2 - M_1)}{2}$$

wherein $M_2$ is the valley material ratio,
$M_1$ is the peak material ratio, and
$R_K$ is the core depth calculated in microinches;

d) an average ratio of mean peak height ($R_{PM}$) to mean peak-to-valley height ($R_{z(DIN)}$) of less than about 0.37;

e) an average skewness ($R_{SK}$) less than about −1, where $R_{SK}$ is the third moment of the graphical representation of the distribution of height (amplitude distribution curve) over the total profile depth; and f) an average kurtosis ($R_{KU}$) less than about 9, where $R_{KU}$ is the fourth moment of the graphical representation of the distribution of height (amplitude distribution curve) over the total profile depth.

95. The method of claim 91, wherein the step of texturing the at least one surface such that the at least one surface of stock results in the at least one surface having at least one parameter selected from the following group:

a) an average material filled profile peak area ($V_1$) of about 25, $V_1$ being computed according to the equation:

$$V_1 = \frac{R_{PK}(M_1)}{2}$$

wherein $M_1$ is the peak material ratio, and
$R_{PK}$ is the reduced peak height calculated in microinches;

b) an average oil retention volume ($V_o$) of about 560, $V_o$ being computed according to the equation $$V_O = \frac{R_{VK}(100 - M_2)}{2}$$

nwherein $M_2$ is the valley material ratio, and
$R_{VK}$ is the reduced valley depth calculated in microinches;

c) an average usable material volume ($V_u$) of about 1943, $V_u$ being computed according to the equation $$V_u = \frac{R_K(M_2 - M_1)}{2}$$

wherein $M_2$ is the valley material ratio,
$M_1$ is the peak material ratio, and $R_K$ is the core depth calculated in microinches;

d) an average ratio of mean peak height ($R_{PM}$) to mean peak-to-valley height ($R_{z(DIN)}$) of about 0.32;

e) an average skewness ($R_{SK}$) of about −1.66, where $R_{SK}$ is the third moment of the graphical representation of the distribution of height (amplitude distribution curve) over the total profile depth; and f) an average kurtosis ($R_{KU}$) of about 7.5, where $R_{KU}$ is the fourth moment of the graphical representation of the distribution of height (amplitude distribution curve) over the total profile depth.

96. The method of claim 91, wherein the step of texturing the at least one surface comprises the steps of:

texturing the first surface; and texturing the second surface.

97. A separator plate for use in an automatic transmission and the like, wherein friction plates are interleaved with separator plates, comprising:

a first surface and a second surface substantially parallel to each other, at least one of the first and second surfaces having a texture to improve operating characteristics compared to conventional separator plates, the texture of the at least one surface characterized by a regular pattern of recesses, the at least one surface having an average material filled profile peak area ($V_1$) less than about 32, $V_1$ being computed according to the following equation:

$$V_1 = \frac{R_{PK}(M_1)}{2}$$

wherein $M_1$ is the peak material ratio; and $R_{PK}$ is the reduced peak height calculated in microinches.

* * * * *